(12) United States Patent
Wang et al.

(10) Patent No.: US 11,017,066 B2
(45) Date of Patent: May 25, 2021

(54) METHOD FOR ASSOCIATING APPLICATION PROGRAM WITH BIOMETRIC FEATURE, APPARATUS, AND MOBILE TERMINAL

(71) Applicant: Huawei Technologies Co., Ltd., Shenzhen (CN)

(72) Inventors: Chan Wang, Shenzhen (CN); Huangwei Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 202 days.

(21) Appl. No.: 16/067,489

(22) PCT Filed: Dec. 29, 2015

(86) PCT No.: PCT/CN2015/099550
§ 371 (c)(1),
(2) Date: Jun. 29, 2018

(87) PCT Pub. No.: WO2017/113119
PCT Pub. Date: Jul. 6, 2017

(65) Prior Publication Data
US 2019/0026452 A1    Jan. 24, 2019

(51) Int. Cl.
G06F 21/32    (2013.01)
G06F 21/62    (2013.01)

(52) U.S. Cl.
CPC ............ *G06F 21/32* (2013.01); *G06F 21/629* (2013.01)

(58) Field of Classification Search
USPC ........................................................ 713/186
See application file for complete search history.

(56) References Cited

U.S. PATENT DOCUMENTS 8,265,509 B2 *  9/2012  Sekiya ................... G06F 21/34
                                                    399/80
8,627,096 B2 *  1/2014  Azar ...................... H04N 7/002
                                                    713/186
(Continued)

FOREIGN PATENT DOCUMENTS

CN    101140609 A    3/2008
CN    101620675 A    1/2010
(Continued)

OTHER PUBLICATIONS

Machine Translation and Abstract of Chinese Publication No. CN103136533, Jun. 5, 2013, 14 pages.
(Continued)

*Primary Examiner* — Andrew J Steinle
*Assistant Examiner* — Sakinah White Taylor
(74) *Attorney, Agent, or Firm* — Conley Rose, P.C.

(57) ABSTRACT

A method for associating an application program with a biometric feature, an association apparatus, and a mobile terminal, and relate to the field of communications technologies. The method includes obtaining a biometric feature association request of a first application, receiving a first request from the first application, where the first request is used to request to associate the first application with a biometric feature, obtaining type information of the first application, determining a second application installed on a mobile terminal, where type information of the second application matches the type information of the first application, and the second application is associated with a first biometric feature, and associating the first application with the first biometric feature. Hence, quick biometric feature association is implemented, and biometric feature association efficiency is improved.

20 Claims, 8 Drawing Sheets

(56) References Cited

U.S. PATENT DOCUMENTS

| | | | |
|---|---|---|---|
| 9,503,894 B2* | 11/2016 | Shanmugam | H04W 12/06 |
| 2009/0320106 A1* | 12/2009 | Jones | G06Q 20/206 |
| | | | 726/5 |
| 2012/0101975 A1* | 4/2012 | Khosravy | G06Q 10/063 |
| | | | 706/55 |
| 2012/0306616 A1* | 12/2012 | Griffin | G06F 21/32 |
| | | | 340/5.52 |
| 2015/0067827 A1 | 3/2015 | Lim et al. | |
| 2015/0106765 A1 | 4/2015 | Lee et al. | |
| 2015/0169858 A1* | 6/2015 | Tg | H04L 63/0861 |
| | | | 726/18 |
| 2015/0254467 A1* | 9/2015 | Leuthardt | G06F 21/606 |
| | | | 726/28 |
| 2015/0319168 A1* | 11/2015 | McCarty | H04L 63/0861 |
| | | | 713/186 |
| 2015/0324609 A1* | 11/2015 | Grubel | H04L 63/105 |
| | | | 726/26 |
| 2015/0350200 A1* | 12/2015 | Li | H04W 12/0608 |
| | | | 726/8 |
| 2016/0063230 A1* | 3/2016 | Alten | G06F 21/32 |
| | | | 726/28 |
| 2016/0267610 A1* | 9/2016 | Corbett | G06F 16/583 |
| 2017/0148017 A1 | 5/2017 | Hu et al. | |
| 2017/0148029 A1 | 5/2017 | Hu et al. | |
| 2018/0232522 A1* | 8/2018 | Shear | G06F 21/445 |

FOREIGN PATENT DOCUMENTS

| | | | |
|---|---|---|---|
| CN | 103136533 A | | 6/2013 |
| CN | 103458392 A | | 12/2013 |
| CN | 104036200 A | | 9/2014 |
| CN | 104038509 A | | 9/2014 |
| CN | 104331654 A | | 2/2015 |
| CN | 104468457 A | | 3/2015 |
| CN | 104700268 A | | 6/2015 |
| CN | 104717357 A | | 6/2015 |
| CN | 104820797 A | | 8/2015 |
| CN | 105306490 A | | 2/2016 |
| CN | 105488679 A | | 4/2016 |
| WO | 2013173838 A2 | | 11/2013 |
| WO | 2016048877 A1 | | 3/2016 |

OTHER PUBLICATIONS

Machine Translation and Abstract of Chinese Publication No. CN103458392, Dec. 18, 2013, 17 pages.
Machine Translation and Abstract of Chinese Publication No. CN104038509, Sep. 10, 2014, 9 pages.
Machine Translation and Abstract of Chinese Publication No. CN104468457, Mar. 25, 2015, 9 pages.
Machine Translation and Abstract of Chinese Publication No. CN104700268, Jun. 10, 2015, 43 pages.
Machine Translation and Abstract of Chinese Publication No. CN104820797, Aug. 5, 2015, 23 pages.
Foreign Communication From a Counterpart Application, PCT Application No. PCT/CN2015/099550, English Translation of International Search Report dated Sep. 14, 2016, 2 pages.
Foreign Communication From a Counterpart Application, PCT Application No. PCT/CN2015/099550, English Translation of Written Opinion dated Sep. 14, 2016, 6 pages.
Foreign Communication From a Counterpart Application, PCT Application No. PCT/CN2016/087993, English Translation of International Search Report dated Mar. 22, 2017, 2 pages.
Machine Translation and Abstract of Chinese Publication No. CN101140609, Mar. 12, 2008, 17 pages.
Machine Translation and Abstract of Chinese Publication No. CN101620675, Jan. 6, 2010, 5 pages.
Machine Translation and Abstract of Chinese Publication No. CN104036200, Sep. 10, 2014, 10 pages.
Machine Translation and Abstract of Chinese Publication No. CN104331654, Feb. 4, 2015, 31 pages.
Foreign Communication From a Counterpart Application, Chinese Application No. 201580085616.6, Chinese Office Action dated Sep. 25, 2019, 11 pages.

* cited by examiner

US 11,017,066 B2

METHOD FOR ASSOCIATING APPLICATION PROGRAM WITH BIOMETRIC FEATURE, APPARATUS, AND MOBILE TERMINAL

CROSS-REFERENCE TO RELATED APPLICATION

This application is a U.S. National Stage of International Patent Application No. PCT/CN2015/099550, filed on Dec. 29, 2015, which is hereby incorporated by reference in its entirety.

TECHNICAL FIELD

Embodiments of the present disclosure relate to the field of communications technologies, and in particular, to a method for associating an application program with a biometric feature, an apparatus, and a mobile terminal.

BACKGROUND

With development of the mobile Internet, intelligent terminals are increasingly popular, and become indispensable in people's daily work and life. As user equipment becomes intelligent, a growing quantity of mobile terminals are provided with a fingerprint identification function. A user may unlock the user's mobile terminal by means of fingerprint identification, complete payment verification by means of fingerprint identification when using a mobile terminal to make a purchase payment, or determine, when logging in to an application account, a user identity by attempting to authenticate the user's fingerprint in order to log in to a corresponding account.

There are a growing quantity of applications installed by a user on a mobile terminal, and many applications have a same application type. If applications belong to a same application type, for example, "Bank of China" and "Industrial and Commercial Bank of China" are payment-type applications, it is assumed that a Bank of China application (also referred to as APP) program has registered an index finger as a verification fingerprint used during payment, and an Industrial and Commercial Bank of China APP also needs to re-register a verification fingerprint used during payment. Therefore, if each application that needs to register a fingerprint on the mobile terminal registers the fingerprint alone, such a repeated fingerprint registration process brings a great deal of inconvenience to the user, and the user needs to perform repeated operations to complete registration. Consequently, operation steps are cumbersome.

SUMMARY

Embodiments of the present disclosure provide a method for associating an application program with a biometric feature, an apparatus, and a mobile terminal in order to resolve a technical problem that an operation is cumbersome and registration efficiency is relatively low because the mobile terminal requires a user to enter fingerprint images multiple times during fingerprint registration.

According to a first aspect, an embodiment of the present disclosure provides a method for associating an application program with a biometric feature.

In a basic implementation, the method includes receiving a first request sent by a first application, where the first request is used to request to associate the first application with a biometric feature, obtaining type information of the first application, determining a second application installed on a mobile terminal, where type information of the second application matches the type information of the first application, and the second application is associated with a first biometric feature, and associating the first application with the first biometric feature. Type information of an application is obtained, another application whose type information matches the type information of the application is determined according to the type information, and a biometric feature associated with the other application is associated with the application, thereby implementing quick biometric feature association, and improving biometric feature association efficiency.

Further, based on the basic implementation, before associating the first application with the first biometric feature, the mobile terminal may obtain an identity authentication biometric feature entered by a user, where the identity authentication biometric feature is a biometric feature used for biometric authentication, and associate the first application with the first biometric feature if the identity authentication biometric feature matches a preset biometric feature. A biometric feature is entered to perform identity authentication, thereby improving accuracy of biometric feature registration performed by the mobile terminal and security of the terminal, and avoiding a misoperation caused by directly setting the first biometric feature as an authentication biometric feature of the second application. In addition, the preset biometric feature may be the first biometric feature. Identity authentication is performed using a same biometric feature, thereby improving security of biometric feature registration performed by the mobile terminal. Further, if the identity authentication biometric feature does not match the preset biometric feature, the mobile terminal presents second prompt information, where the second prompt information is used to prompt the user to perform identity authentication. In this case, because identity authentication fails, the mobile terminal requests the user to perform identity authentication to ensure security, thereby further ensuring user's use security.

Further, based on the basic implementation, the mobile terminal receives the first request sent by the first application. The user triggers the mobile terminal to enter a corresponding instruction and request to associate the first application with a second biometric feature. The mobile terminal receives a request sent by the first application, where the request is further used to request to associate the first application with the second biometric feature. This solution enables the mobile terminal to associate applications that have same type information with a same biometric feature, thereby reducing biometric feature management complexity. Still further, if the second application is not installed on the mobile terminal, the mobile terminal associates the first application with the second biometric feature, that is, when an application similar to the first application is not installed on the mobile terminal, the mobile terminal sets, according to a user instruction, a biometric feature that the user needs to associate.

Further, based on the basic implementation, before associating the first application with the first biometric feature, the mobile terminal presents first prompt information, where the first prompt information is used to prompt the user whether to set the first biometric feature as an authentication biometric feature of the first application, and obtains a confirmation instruction entered by the user, and associates the first application with the first biometric feature according to the confirmation instruction. The mobile terminal presents the prompt information so as to obtain the confirmation instruction of the user, thereby avoiding directly setting the first biometric feature as an authentication biometric feature of the first application, and improving association accuracy.

Further, based on the basic implementation, steps may be performed in different execution environments. For example, the mobile terminal receives, in a first execution environment, the first request sent by the first application, obtains the type information of the first application in the first execution environment, and associates the first application with the first biometric feature in a second execution environment. Execution environments of some steps are specified, and a step that is related to a secret or has relatively high confidentiality is performed in an execution environment with relatively high security. On the basis of implementing quick biometric feature association and improving association efficiency, biometric feature association security is improved, and user information disclosure is effectively prevented.

Accordingly, an embodiment of the present disclosure further provides an embodiment of a mobile terminal and an embodiment of an association apparatus that can be used to perform the foregoing method, thereby implementing quick biometric feature association, and improving biometric feature association efficiency.

According to a second aspect, an embodiment of the present disclosure provides a method for associating an application program with a biometric feature.

In a basic implementation, the method includes receiving a first request sent by a first application, where the first request is used to request to associate the first application with a biometric feature, obtaining type information of the first application, determining a first biometric feature stored in a mobile terminal, where type information of the first biometric feature matches the type information of the first application, and associating the first application with the first biometric feature. The type information of the first biometric feature and the type information of the first application are obtained, and whether to set the first biometric feature as an authentication biometric feature of the first application is determined based on whether the type information of the first biometric feature matches the type information of the first application such that a user can quickly perform quick biometric feature association on a same type of applications or applications that have a same service type, thereby improving biometric feature association efficiency.

Further, based on the basic implementation, before associating the first application with the first biometric feature, the method further includes obtaining identity authentication information entered by a user, where the identity authentication information is information used for identity authentication, and associating the first application with the first biometric feature includes, if it is determined, according to the identity authentication information, that identity authentication succeeds, associating the first application with the first biometric feature. A biometric feature is entered to perform identity authentication, thereby improving accuracy of biometric feature registration performed by the mobile terminal and security of the terminal, and avoiding a misoperation caused by directly setting the first biometric feature as an authentication biometric feature of a second application.

Further, based on the basic implementation, before associating the first application with the first biometric feature, the method further includes presenting first prompt information, where the first prompt information is used to prompt the user whether to associate the first application with the first biometric feature, and associating the first application with the first biometric feature includes obtaining a confirmation instruction entered by the user, and associating the first application with the first biometric feature according to the confirmation instruction. The mobile terminal presents the prompt information so as to obtain the confirmation instruction of the user, thereby avoiding directly setting the first biometric feature as an authentication biometric feature of the first application, and improving association accuracy.

Further, based on the basic implementation, steps may be performed in different execution environments. For example, the mobile terminal receives, in a first execution environment, the first request sent by the first application, obtains the type information of the first application in the first execution environment, and associates the first application with the first biometric feature in a second execution environment. Execution environments of some steps are specified, and a step that is related to a secret or has relatively high confidentiality is performed in an execution environment with relatively high security. On the basis of implementing quick biometric feature association and improving association efficiency, biometric feature association security is improved, and user information disclosure is effectively prevented.

Further, based on the basic implementation, if the mobile terminal does not store the first biometric feature, the method further includes obtaining a second biometric feature entered by the user, and associating the first application with the second biometric feature. In this case, because the terminal does not store the first biometric feature, the terminal obtains and associates the second biometric feature entered by the user to ensure user's use.

Accordingly, an embodiment of the present disclosure further provides an embodiment of a mobile terminal and an embodiment of an association apparatus that can be used to perform the foregoing method, thereby implementing quick biometric feature association, and improving biometric feature association efficiency.

According to a third aspect, an embodiment of the present disclosure provides a method for associating an application program with a biometric feature.

In a basic implementation, the method includes receiving a first request sent by a first application, where the first request is used to request to associate the first application with a biometric feature, obtaining a first fingerprint image entered by a user, determining a first fingerprint storage template stored in a mobile terminal, where the first fingerprint storage template matches the first fingerprint image, and the first fingerprint storage template includes multiple fingerprint images, and associating the first application with the first fingerprint storage template. In this embodiment of the present disclosure, the user enters a fingerprint image only once when registering a fingerprint. After obtaining the fingerprint image entered once, the mobile terminal may compare the fingerprint image with a stored fingerprint storage template, and set a matched fingerprint storage template as an authentication fingerprint of a to-be-registered application, thereby achieving an effect that the user can successfully perform fingerprint registration by entering the fingerprint image once, improving fingerprint association efficiency, and improving user experience.

Further, based on the basic implementation, before the associating the first application with the first fingerprint storage template, the method further includes obtaining identity authentication information entered by the user, where the identity authentication information is information used for identity authentication, and if it is determined, according to the identity authentication information, that identity authentication succeeds, associating the first application with the first fingerprint storage template. A biometric feature is entered to perform identity authentication, thereby improving accuracy of biometric feature registration performed by the mobile terminal and security of the terminal, and avoiding a misoperation caused by directly setting the first biometric feature as an authentication biometric feature of a second application.

Further, based on the basic implementation, before the associating the first application with the first fingerprint storage template, the method further includes presenting first prompt information, where the first prompt information is used to prompt the user whether to associate the first application with the first fingerprint storage template, and obtaining a confirmation instruction entered by the user, and associating the first application with the first fingerprint storage template according to the confirmation instruction. The mobile terminal presents the prompt information so as to obtain the confirmation instruction of the user, thereby avoiding directly setting the first biometric feature as an authentication biometric feature of the first application, and improving association accuracy.

Further, based on the basic implementation, if the mobile terminal does not store the first fingerprint storage template, the method further includes obtaining a second fingerprint image entered by the user, where the first fingerprint image and the second fingerprint image are two fingerprint images of a same fingerprint, and generating an authentication fingerprint of the first application according to the first fingerprint image and the second fingerprint image. In this case, because the terminal does not store the first fingerprint storage template, the terminal obtains the second fingerprint image entered by the user so as to generate a fingerprint, thereby ensuring user's use.

Accordingly, an embodiment of the present disclosure further provides an embodiment of a mobile terminal and an embodiment of an association apparatus that can be used to perform the foregoing method, thereby implementing quick biometric feature association, and improving biometric feature association efficiency.

In this embodiment of the present disclosure, type information of an application is obtained, another application whose type information matches the type information of the application is determined according to the type information, and a biometric feature associated with the other application is associated with the application, thereby implementing quick biometric feature association, and improving biometric feature association efficiency.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some but not all embodiments of the present disclosure. Persons of ordinary skill in the art may still derive other drawings from these accompanying drawings without creative efforts.

DESCRIPTION OF EMBODIMENTS

Figure 1:
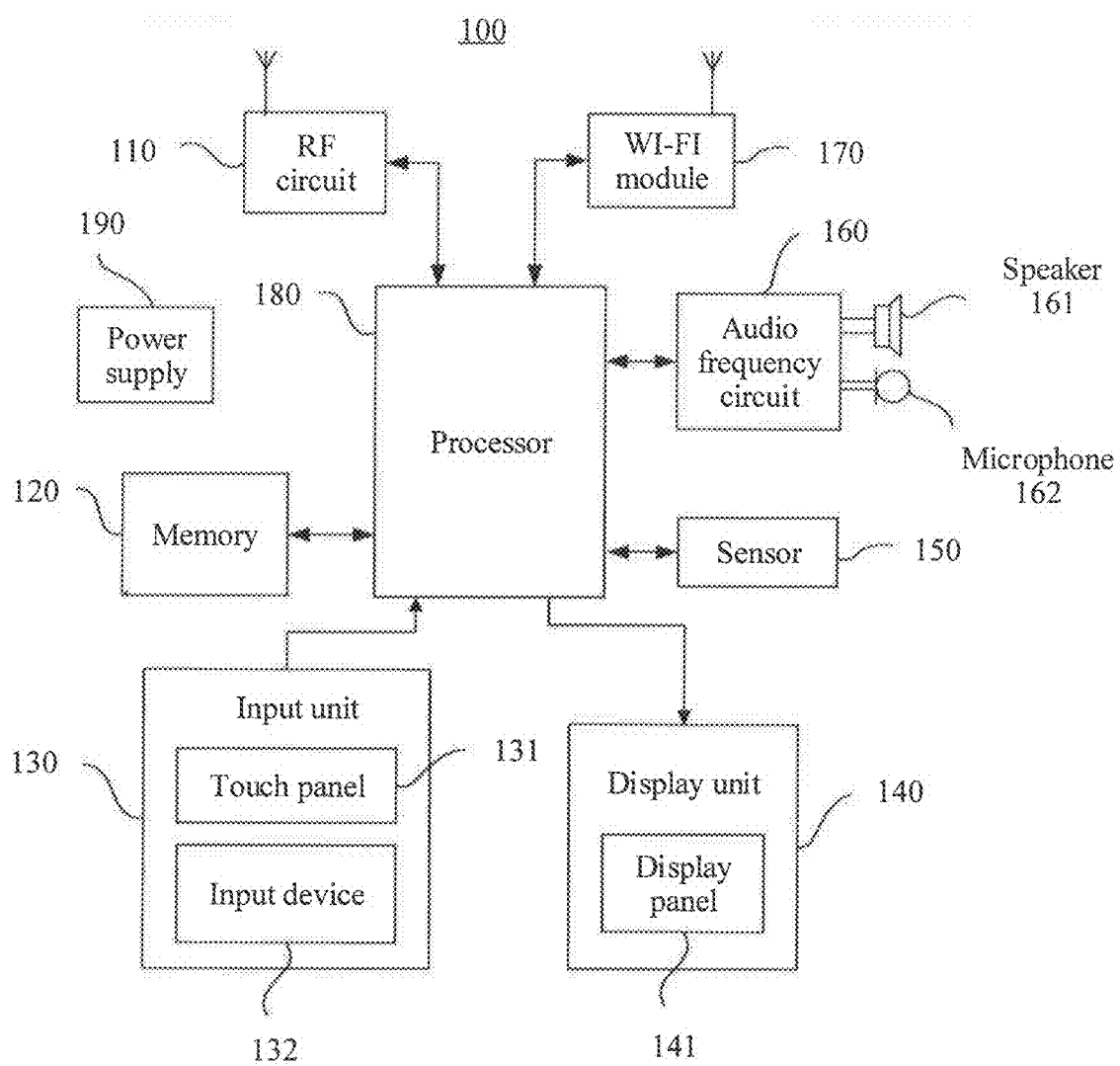
FIG. 1 is a schematic structural diagram of a mobile terminal according to an embodiment.

To make the objectives, technical solutions, and advantages of the present disclosure clearer, the following further describes the embodiments of the present disclosure in detail with reference to the accompanying drawings. All other embodiments obtained by persons of ordinary skill in the art without creative efforts shall fall within the protection scope of the present disclosure. In specific descriptions of the following embodiments, related concepts are further explained based on a technical understanding of persons of ordinary skill in the art. It should be noted that these concepts constitute no limitation on explanations of a concept and a term well known in the technical field.

User equipment which may also be referred to as a mobile terminal or an intelligent terminal, includes but is not limited to a mobile phone, a mobile computer, a tablet computer, a personal digital assistant (PDA), a media player, a smart television, a smart watch, smart glasses, a smart band, and the like. In the embodiments of the present disclosure, a method for sharing a fingerprint storage template may be applied to various mobile terminals. The following describes a specific implementation performed by a mobile terminal that performs the method. In other implementations of the present disclosure, a well-known method, process, component, and circuit are not described in detail.

An operating system (OS) is a computer program that manages computer hardware and software resources, and is a kernel and a cornerstone of a computer system. With development of mobile communications technologies, mobile terminal technologies have rapidly developed. A modern mobile terminal device provides a strong and flexible rich execution environment (REE), but the device is also vulnerable to a security threat. The REE refers to an OS that has a strong processing capability and a multimedia function, such as ANDROID and IOS.

A trusted execution environment (TEE) is a technical solution proposed to resolve a problem of a security risk of a current mobile terminal device. The TEE is defined by GLOBALPLATFORM, and is a secure area that resides on a main processor of a connected device in order to ensure storage, processing, and protection of sensitive data in the TEE. The TEE is a trusted OS that has a secure processing capability and provides a secure peripheral operation, and is mutually isolated from an REE on a same device and independently runs. The TEE and the REE run on a same device in parallel, and a processor switches between the REE and the TEE according to an SMC instruction. The TEE can ensure that storage, processing, and protection of the sensitive data are performed in the trusted environment, provide a secure execution environment for authorized security software (for example, a trusted application (TA)), and implement end-to-end security by executing protection, confidentiality, integrity, and data access permission.

A secure element (SE), which is an electronic component that has a tamper-resistant function, may be installed on a mobile terminal to provide a secure and confidential data storage and running environment for an application installed on the SE. By extension of this, a hardware device that provides storage space used to install an application and has a management function for an installed application may be considered as a SE. For example, a smartphone on which an ANDROID system is installed may install third-party applications, and the ANDROID OS may manage these third-party applications and provide specific protection. Therefore, the smartphone may be considered as an SE in a broad sense. The SE includes software and tamper-resistant hardware, supports high-level security, such as a SIM card, a financial IC card, and a smart SD card, and may run with the TEE together. Terms corresponding to the SE in different specifications may be different. For example, in a series of GLOBALPLATFORM specifications, this term SE is defined and used. However, in a series of near field communication (NFC) Forum specifications, a term NFC execution environment (NFCEE) is used instead of the SE. It should be noted that these two terms are equivalent in solutions of the embodiments of the present disclosure.

A TA is an application that runs in the TEE, and may access all functions of a main processor and a memory of a device. A hardware isolation technology is used to protect the TA from being affected by application software installed in the REE. A client application (CA) runs in the REE, and the CA accesses the TA by invoking a TEE client application programming interface (API) located in the REE in order to use security functions provided by the TEE and the TA. A trusted user interface (TUI) is an application interface of the TA, and is used to securely present a user interface to a user in order to prevent an attack in a form such as phishing.

A biometric feature relying TA (RTA) is a concept defined in the draft standard "TEE Trusted User Interface API for Biometrics" published in December 2014, is a special TA, and is a TA that responds to a biometric feature verification result. In all TAs, a TA that requires biometric feature authentication may be an RTA. For example, the RTA responds to a fingerprint identification result in the TEE environment, and feeds back the responded result to the CA in the REE environment. Optionally, the RTA may be referred to as a fingerprint TA, or the like according to different specific biometric features.

A storage template (or Stored Template) is also a concept (A Template created through Enrollment and stored with a unique identifier for use in future Identification and Verification) defined in the draft standard "TEE Trusted User Interface API for Biometrics" published in December 2014, is a template created in a biometric feature registration process, has a unique identifier, and is used for identification and verification in a use process. In the embodiments of the present disclosure, the storage template may be a registered biometric feature, that is, in some embodiments, a storage template of a biometric feature is equivalent to the biometric feature. For example, a fingerprint storage template may be equivalent to a fingerprint.

FIG. 1 is a schematic structural diagram of a mobile terminal 100 according to an embodiment. It should be understood that the mobile terminal 100 shown in FIG. 1 is merely an example, and the actual product may have more or fewer parts than those shown in FIG. 1, may combine two or more parts, or may have different part configurations. Various parts shown in the figure may be implemented in hardware that includes one or more signal processors and/or application-specific integrated circuits, in software, or in a combination of hardware and software. As shown in FIG. 1, the mobile terminal 100 includes parts such as a radio frequency (RF) circuit 110, a memory 120, an input unit 130, a display unit 140, a sensor 150, an audio frequency circuit 160, a WI-FI module 170, a processor 180, and a power supply 190. The following describes each composition part in detail.

The RF circuit 110 may be configured to receive and send a signal in an information receiving/transmitting process or a call process, and in particular, after receiving downlink information from a base station, send the downlink information to the processor 180 for processing, and in addition, send designed uplink data to the base station. Generally, the RF circuit 110 includes but is not limited to an antenna, at least one amplifier, a transceiver, a coupler, a low noise amplifier (LNA), a duplexer, and the like. In addition, the RF circuit 110 may communicate with a network and another device by means of wireless communications. The wireless communications may use any communications standard or protocol, including but not limited to Global System for Mobile Communications (GSM), general packet radio service (GPRS), Code Division Multiple Access (CDMA), Wideband CDMA (WCDMA), Long Term Evolution (LTE), an electronic mail (e-mail), short message service (SMS), and the like.

The memory 120 may be configured to store a software program and a module, and the processor 180 performs various function applications of the mobile terminal 100 and data processing by running the software program and the module stored in the memory 120. The memory 120 may mainly include a program storage area and a data storage area. The program storage area may store an OS, an application program required by at least one function (such as a sound playing function or an image playing function), and the like, and the data storage area may store data (such as audio data or an address book) created according to use of the mobile terminal 100, and the like. In addition, the memory 120 may include a high-speed random access memory (RAM), or may include a nonvolatile memory, such as at least one magnetic disk storage device, a flash device, or another volatile solid-state storage device.

The input unit 130 may be configured to receive input number or character information, and generate key signal input related to user setting and function control of the mobile terminal 100. Further, the input unit 130 may include a touch panel 131 and an input device 132. The touch panel 131, also referred to as a touchscreen, may collect a touch operation (for example, an operation performed by a user on the touch panel 131 or near the touch panel 131 using any proper object or accessory, such as a finger or a stylus) performed by the user on or near the touch panel 131, and drive a corresponding connection apparatus according to a preset program. Optionally, the touch panel 131 may include two parts, a touch detection apparatus and a touch controller. The touch detection apparatus detects a touch orientation of the user, and detects a signal brought by the touch operation, and sends the signal to the touch controller. The touch controller receives touch information from the touch detection apparatus, converts the touch information into contact coordinates, then sends the contact coordinates to the processor 180, and can receive and execute a command sent by the processor 180. In addition, the touch panel 131 may be implemented in multiple types, such as a resistive type, a capacitive type, infrared, and a surface acoustic wave. In addition to the touch panel 131, the input unit 130 may include the input device 132. Further, the input device 132 may include but is not limited to one or more of a physical keyboard, a function key (such as a volume control key or an on/off key), a trackball, a mouse, a joystick, or the like.

The display unit 140 may be configured to display information entered by the user or information provided for the user, and various menus of the mobile terminal 100. The display unit 140 may include a display panel 141. Optionally, the display panel 141 may be configured in a form, such as liquid crystal display (LCD) and an organic light-emitting diode (OLED). Further, the touch panel 131 may cover the display panel 141. After detecting the touch operation on or near the touch panel 131, the touch panel 131 sends the touch operation to the processor 180 to determine a type of a touch event, and then the processor 180 provides corresponding visual output on the display panel 141 according to the type of the touch event. In FIG. 1, the touch panel 131 and the display panel 141 serve as two independent parts to implement input and output functions of the mobile terminal 100. However, in some embodiments, the touch panel 131 and the display panel 141 may be integrated to implement the input and output functions of the mobile terminal 100.

The mobile terminal 100 may further include at least one sensor 150, such as a fingerprint sensor, a light sensor, a motion sensor, and another sensor. Further, the fingerprint sensor is configured to identify fingerprint information entered by the user. The light sensor may include an ambient light sensor and a proximity sensor. The ambient light sensor may adjust brightness of the display panel 141 according to luminance of ambient light, and the proximity sensor may disable the display panel 141 and/or backlight when the mobile terminal 100 approaches an ear. As a motion sensor, an accelerometer sensor may detect a value of acceleration in each direction (generally, three axes), may detect a value and a direction of gravity in a static state, and may be configured to identify an application of a mobile terminal posture (such as switching between a landscape and a portrait, a related game, and magnetometer posture calibration), a function related to vibration identification (such as a pedometer and a strike), and the like. Other sensors such as a gyroscope, a barometer, a hygrometer, a thermometer, and an infrared sensor may be further configured in the mobile terminal 100, and details are not described herein.

The audio frequency circuit 160, a speaker 161, and a microphone 162 may provide an audio interface between the user and the mobile terminal 100. The audio frequency circuit 160 may convert received audio data into an electrical signal, and transmit the electrical signal to the speaker 161, and the speaker 161 converts the electrical signal into a voice signal for output. In addition, the microphone 162 converts a collected voice signal into an electrical signal, and the audio frequency circuit 160 receives the electrical signal, converts the electrical signal into audio data, and outputs the audio data to the RF circuit 110 in order to send the audio data to, for example, another mobile terminal, or output the audio data to the memory 120 for further processing.

WI-FI belongs to a short-range wireless transmission technology. The mobile terminal 100 may help, using the WI-FI module 170, the user receive and send e-mails, browse a web page, access streaming media, and the like. The WI-FI module 170 provides the user with wireless broadband Internet access. Although FIG. 1 shows the WI-FI module 170, it may be understood that the WI-FI module 170 is not a mandatory component of the mobile terminal 100, and may be omitted according to a requirement without changing the essence scope of the present disclosure.

The processor 180 is a control center of the mobile terminal 100, and is connected to each part of the entire mobile terminal using various interfaces and lines, and performs various functions of the mobile terminal 100 and data processing by running or executing the software program and/or the module that are/is stored in the memory 120 and invoking data stored in the memory 120 in order to perform overall monitoring on the mobile terminal. Optionally, the processor 180 may include one or more processing units. Preferably, the processor 180 may integrate an application processor and a modem processor. The application processor mainly processes an OS, a user interface, an application program, and the like, and the modem processor mainly processes wireless communications. It may be understood that the modem processor may be not integrated into the processor 180.

The mobile terminal 100 further includes the power supply 190 (for example, a battery) that supplies power to each part. Preferably, the power supply 190 may be logically connected to the processor 180 using a power management system in order to manage functions such as charging, discharging, and power consumption using the power management system.

Although not shown in FIG. 1, the mobile terminal 100 may further include a camera, a BLUETOOTH module, and the like, and details are not described herein.

Figure 2:
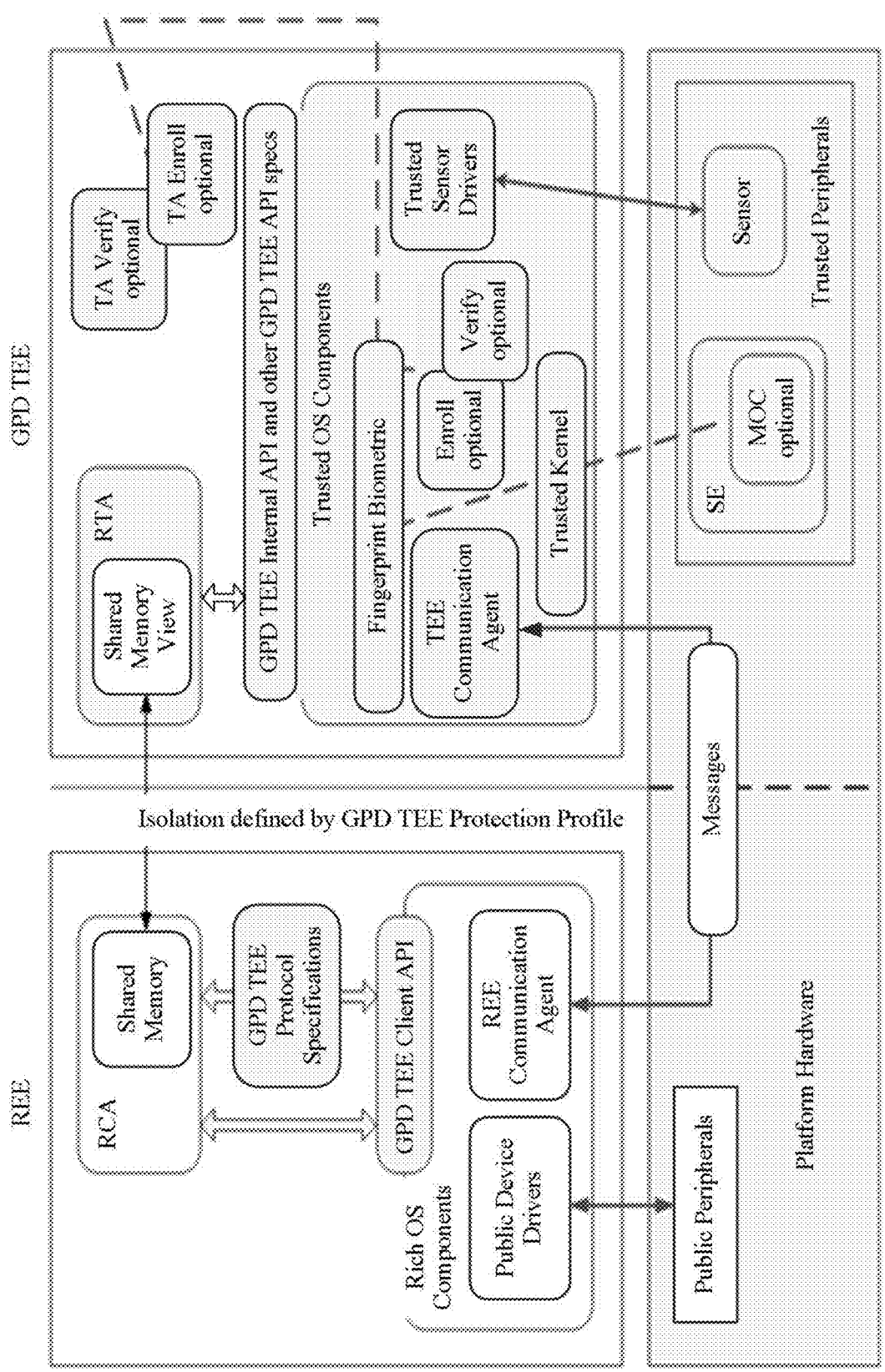
FIG. 2 is a diagram of a fingerprint identification architecture defined in a standard.

FIG. 2 is a diagram of a fingerprint identification architecture defined in a standard. As shown in FIG. 2, an interface between a TEE and an REE is referred to as a TEE Client API, and GLOBALPLATFORM standardizes the TEE Client API in 2010. A CA runs in an REE environment, and the CA accesses the TEE by invoking the TEE Client API in the REE environment in order to invoke the above-mentioned TEE security service example. Further, the TEE Client API includes an agent driver (REE Communication Agent). In the REE, the CA communicates with an agent driver (TEE Communication Agent) in the TEE using the REE communication agent in the REE in order to implement information exchange between the CA and a TA in the REE. The CA cannot directly access a resource of the TEE without using the REE communication agent. The TA runs in a TEE OS. The TEE can run multiple mutually independent TAs developed by different providers. The TA runs in the TEE and provides a security service for a CA corresponding to the TA. The TA may obtain controlled access to a security resource and a service in the TEE by invoking a TEE Internal API in the TEE. Steps of accessing the TA by the CA include the following. (1) The CA invokes the TEE Client API in the REE environment, and creates a session with the TA. Information about the session created by the CA carries an identifier of the TA, for example, a universally unique identifier (UUID) of the TA. A processor finds, in the TEE environment according to the UUID, a TA corresponding to the CA. (2) The CA initiates a command in the session, where the initiated command is transmitted to a TEE communication agent in the TEE environment using the REE communication agent in the REE environment, and the command may be considered as a request initiated by the CA. Different application scenarios correspond to different command expression forms, and different functions correspond to different command expression forms. (3) The TA obtains, using the TEE communication agent, the command initiated by the CA, and analyzes a message in the command. (4) After obtaining the message in the command, the TA invokes the TEE Internal API to perform a corresponding operation, responds to a request of the CA, and establishes a corresponding task. The TEE communication agent sends an execution result to the REE communication agent, and the CA obtains a response message using the REE communication agent. The TEE Client API and the TEE Internal API are concepts of two API libraries, and the two API libraries each include multiple API interfaces. The foregoing information exchange process is a process of constantly invoking interfaces in the two API libraries for instruction transmission.

For ease of description, an example of this embodiment of the present disclosure is as follows. A mobile terminal obtains a fingerprint registration request of an Industrial and Commercial Bank of China online bank APP, and obtains type information of the Industrial and Commercial Bank of China online bank APP. In a possible implementation, a processor queries all applications installed on the mobile terminal, and determines an application whose type information matches the Industrial and Commercial Bank of China online bank APP, such as ALIPAY. If ALIPAY is associated with a thumb fingerprint, the mobile terminal associates the Industrial and Commercial Bank of China online bank APP with the thumb fingerprint in order to implement quick association between the Industrial and Commercial Bank of China online bank APP and a fingerprint. Further, referring to FIG. 3, a brief description is as follows.

Step 301. A mobile terminal receives a first request sent by a first application, where the first request is used to request to associate the first application with a biometric feature. For example, a processor receives a fingerprint association request sent by an Industrial and Commercial Bank of China online bank APP, and the request requests to set an authentication fingerprint of the Industrial and Commercial Bank of China online bank APP, where the association request may be triggered by a user or may be triggered by a system.

Step 302. Obtain type information of the first application, where the type information is used to represent an attribute of the first application. For details, refer to the following description in step 405. For example, type information of the Industrial and Commercial Bank of China online bank APP is obtained and indicates a "payment-type" application.

Step 303. Determine a second application installed on the mobile terminal, where type information of the second application matches the type information of the first application, and the second application is associated with a first biometric feature. In a possible implementation, the mobile terminal searches, according to the type information of the first application, all applications installed on the mobile terminal, determines the second application, and determines the first biometric feature associated with the second application. In a possible implementation, the mobile terminal first determines at least one application that is installed on the mobile terminal and associated with the biometric feature, and then determines an application that matches the type information of the first application. In a possible implementation, the mobile terminal searches, one by one according to the type information of the first application, second applications installed on the mobile terminal, and when determining the second application, presents prompt information for user selection. This is not limited herein. A specific implementation process may be performed by means of table lookup and the like, and this is not limited, either. For example, the mobile terminal determines ALIPAY installed on the mobile terminal, where an application type of ALIPAY is a "payment type", and ALIPAY is associated with a thumb fingerprint.

Step 304. Associate the first application with the first biometric feature. The Industrial and Commercial Bank of China online bank APP is associated with the thumb fingerprint, and the thumb fingerprint is set as the authentication fingerprint of the Industrial and Commercial Bank of China online bank APP.

In this embodiment of the present disclosure, type information of an application is obtained, another application whose type information matches the type information of the application is determined according to the type information, and a biometric feature associated with the other application is associated with the application, thereby implementing quick biometric feature association, and improving biometric feature association efficiency.

Figure 4:
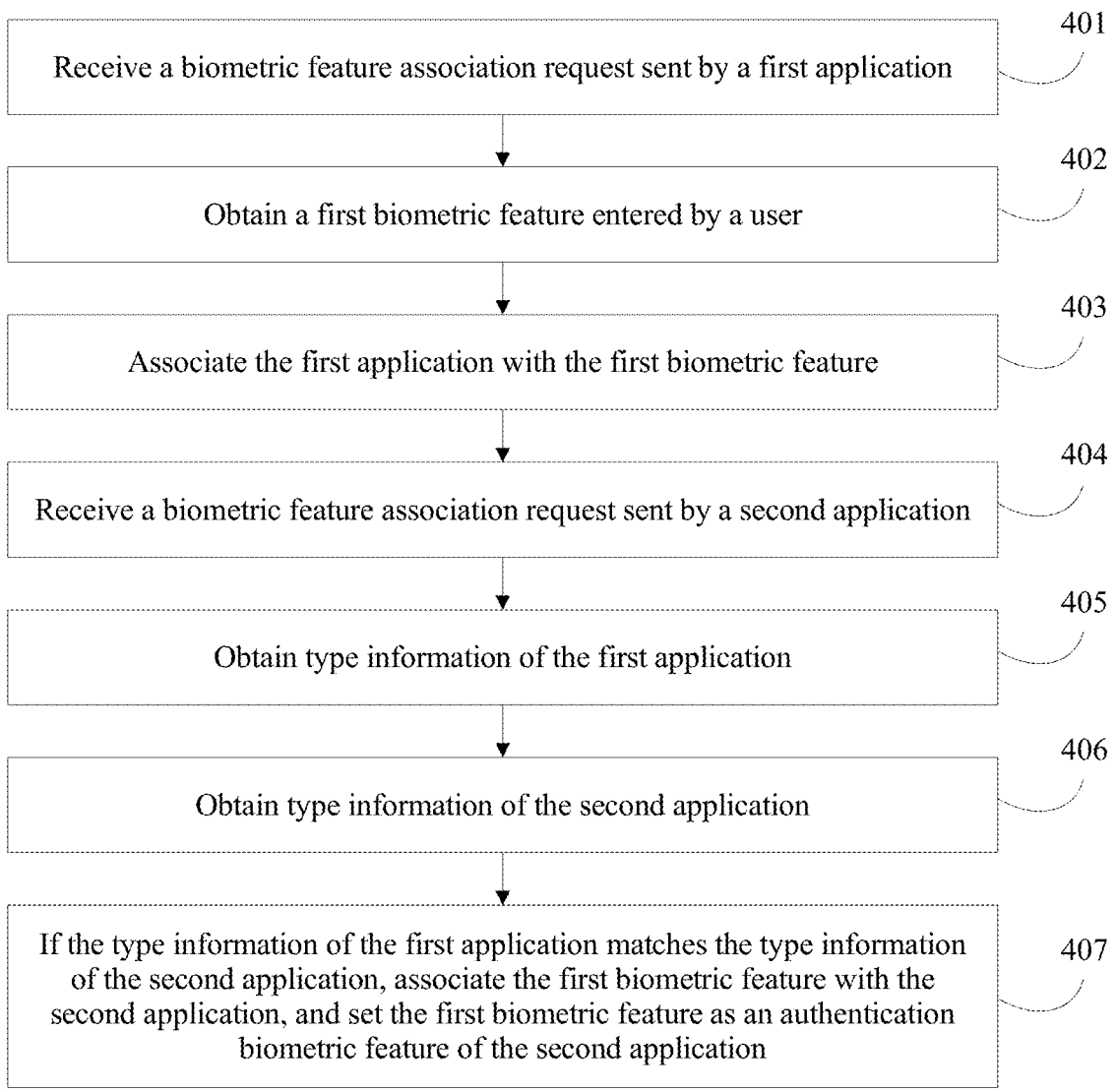
FIG. 4 shows a method for associating an application program with a biometric feature according to an embodiment of the present disclosure.

In an embodiment of the present disclosure, FIG. 4 is a method for associating an application program with a biometric feature according to this embodiment of the present disclosure, and the present disclosure is described from a perspective of performing an entire procedure.

Step 401. Receive a biometric feature association request sent by a first application.

The biometric feature association request is used to request to register a biometric feature that is used by the first application for authentication in a use process, that is, used to request to associate the first application with the biometric feature. The authentication function includes identity authentication, for example, verifying whether a user is an owner, and includes functionality authentication, that is, a function can be performed only after biometric feature authentication. For example, ALIPAY performs fingerprint verification in a payment process to determine whether to pay.

The first application generates the biometric feature association request in a running process. A processor of a mobile terminal receives the biometric feature association request of the first application using a corresponding interface, or a user may actively trigger the biometric feature association request of the first application for biometric feature registration. For a specific execution procedure, refer to the foregoing description in FIG. 2.

Step 402. Obtain a first biometric feature entered by a user. A mobile terminal obtains, using a sensor, the biometric feature entered by the user. The biometric feature may be at least one of a hand shape, a fingerprint, a face shape, an iris, a retina, a pulse, or an auricle.

Step 403. Associate the first application with the first biometric feature.

Further, obtaining a first biometric feature may be considered as a response to the biometric feature association request of the first application. The mobile terminal associates the first application with the first biometric feature, that is, uses the first biometric feature as a biometric feature used by the first application for authentication in a use process. A fingerprint is used as an example. After obtaining a thumb fingerprint entered by the user, the mobile terminal uses the thumb fingerprint as a fingerprint used by the ALIPAY application for authentication in a use process, and associates the thumb fingerprint with the ALIPAY application. During identity authentication and payment authentication, the mobile terminal verifies whether a fingerprint entered by the user matches the thumb fingerprint. The following uses an example in which a biometric feature associated with ALIPAY is the thumb fingerprint for description.

Step 404. Receive a biometric feature association request sent by a second application. Refer to the description in step 401.

Step 405. Obtain type information of the first application.

The type information of the first application is used to represent attribute information of the first application. One application may be corresponding to multiple pieces of type information, and one piece of type information may be corresponding to multiple applications. The type information includes service type information and application type information. The service type information is used to represent attributes of various services included in the first application. It may be understood that one application includes multiple services, that is, may include several types of service type information. In practice, one application may include multiple services. For example, service type information of a WECHAT application may include a "social type" and a "payment type". The former corresponds to a WECHAT chat function, and the latter corresponds to a function, such as WECHAT red packet and WECHAT transfer. The application type information is used to represent an application type of the first application, that is, a specific type to which the application may belong in use, for example, WECHAT belongs to a "social type", and ANGRY BIRDS belongs to a "game type".

Optionally, the type information may be type information defined when an application developer develops an application, such as a "payment-type" application defined when an application developer develops a bank application, or a "social-type" application defined when an application developer develops TWITTER.

Optionally, the type information may be type information that an application store requires an application developer to enter when the application developer uploads an ANDROID package (APK). For example, the application store requires the application developer to attach a tag to the application when uploading the application, such as a social application, a payment application, or a game application, where the tag may be considered as the type information.

Optionally, the type information may be an attribute defined for the first application after an application store performs classification according to a specific standard. For example, when an application developer uploads an APK, the application store does not require the application developer to enter type information, but classifies the APK according to a standard of the application store, and after classification, a main type to which the first application belongs may be considered as the type information.

Optionally, the type information may be obtained by performing semantic analysis on the application according to a semantic feature of the application, that is, a semantic feature value of the first application is obtained. Further, the semantic feature may be understood as follows. One semantic type is sub-classified from a specific perspective such that words that belong to a same semantic type may have different values in terms of a semantic feature or semantic features, thereby highlighting a difference between these words. The values obtained in terms of the semantic feature or the semantic features are the semantic feature values, and the semantic feature value is used to indicate the semantic feature of the application. For example, if the semantic feature value of the application is "friend" and "contact", a type of the application may be a "social type", and a corresponding application is WECHAT, TWITTER, or the like, or if the semantic feature value of the application is "money" and "payment", a type of the application may be a "payment type", and a corresponding application is ALIPAY, a bank application, or the like. Further, the mobile terminal may perform semantic analysis on the mobile terminal, or may request a server to perform semantic analysis. This is not limited herein. A semantic analysis technology is known in the technical field, and specific technical details are not described herein.

Optionally, the mobile terminal obtains the type information of the first application using the server, that is, the mobile terminal sends a request message to the server, and requests the server to send the type information of the first application to the mobile terminal, and the mobile terminal receives a request response sent by the server, where the request response includes the type information of the first application.

Optionally, the mobile terminal obtains the type information of the first application in the mobile terminal, that is, the mobile terminal invokes an installation package of the first application or a related interface of the first application, to obtain the type information.

Step 406. Obtain type information of the second application. For details, refer to the description in step 405.

It should be noted that steps 401, 402, 404, 405, and 406 may be or may be not performed in sequence. In a possible implementation, while associating the first application with the first biometric feature, the mobile terminal may receive the biometric feature association request sent by the second application. In another possible implementation, after associating the first application with the first biometric feature, the mobile terminal may obtain the biometric feature association request of the second application a preset time later, such as two days or two months later.

In a possible implementation, only step 404 and step 405 may be performed after the mobile terminal has associated at least one application with at least one biometric feature. Then, according to the type information of the second application, the mobile terminal determines an application that is installed on the mobile terminal and that matches the type information of the second application, and then performs step 407 to determine whether there is an application that matches the type information of the second application.

Step 407. If the type information of the first application matches the type information of the second application, associate the first biometric feature with the second application, and set the first biometric feature as an authentication biometric feature of the second application. The type information of the first application matches the type information of the second application, that is, the type information of the first application is the same as or similar to the type information of the second application.

The type information of the first application is the same as the type information of the second application. From a perspective of the service type information, it may be understood that the first application and the second application include a same type of service. For example, ALIPAY includes a payment service, Industrial and Commercial Bank of China online bank includes a transfer service, and both ALIPAY and the Industrial and Commercial Bank of China online bank have a function of transferring money to a third party. From a perspective of the application type information, it may be understood that the first application and the second application are applications of a same attribute. For example, both the first application and the second application are "social-type" applications, such as WECHAT and TWITTER. Alternatively, semantic feature values of the first application and the second application are the same, for example, the semantic feature values of the first application and the second application are "contacts", the first application is a contact application, and the second application is a WECHAT application.

The type information of the first application is similar to the type information of the second application. From a perspective of the service type information, it may be understood that the first application and the second application include similar services, such as a payment service of ALIPAY and a red packet service of WECHAT, or a shopping service of ALIPAY and a group buying service of Meituan. From a perspective of the application type information, it may be understood that the first application and the second application are applications that belong to different sub-types in a same main type. For example, the first application is ALIPAY, the second application is an APP developed by a bank, both ALIPAY and the APP belong to a "financial type", a sub-type of ALIPAY is close to a social type, and a sub-type of the APP is close to a wealth management type. Alternatively, it may be understood that semantic feature values of the first application and the second application are similar. For example, a semantic feature value of the first application is "social", a semantic feature value of the second application is "contact", and the type information of the first application is similar to the type information of the second application.

A fingerprint is used as an example. In this embodiment of the present disclosure, the mobile terminal obtains a fingerprint registration request of ALIPAY, obtains a thumb fingerprint entered by the user, uses the thumb fingerprint as a fingerprint used by the ALIPAY application for authentication in a use process, and associates the thumb fingerprint with the ALIPAY application. The mobile terminal obtains a fingerprint registration request of an Industrial and Commercial Bank of China online bank APP, learns that a type of ALIPAY is a "financial type", and learns that a type of the Industrial and Commercial Bank of China online bank APP is the "financial type". The mobile terminal sets the thumb fingerprint as an authentication fingerprint of the Industrial and Commercial Bank of China online bank APP when determining that application type information of ALIPAY is the same as or similar to application type information of the Industrial and Commercial Bank of China online bank APP.

In this embodiment of the present disclosure, type information of an application is obtained, another application whose type information matches the type information of the application is determined according to the type information, and a biometric feature associated with the other application is associated with the application, thereby implementing quick biometric feature association, and improving biometric feature association efficiency.

In an embodiment of the present disclosure, step 407 may be replaced with step 4071. If the type information of the first application matches the type information of the second application, obtain an identity authentication biometric feature entered by the user, where the identity authentication biometric feature is used for identity authentication. Step 4072 includes if the identity authentication biometric feature matches the first biometric feature, associate the first biometric feature with the second application, and set the first biometric feature as the authentication biometric feature of the second application. That is, in this embodiment, if the type information of the first application is the same as or similar to the type information of the second application, the mobile terminal does not directly set the first biometric feature as the authentication biometric feature of the second application, but first performs the step of user identity authentication, where a biometric feature used for user identity authentication is the same biometric feature as the first biometric feature. The mobile terminal sets the first biometric feature as the authentication biometric feature of the second application after the user enters the first biometric feature, that is, after identity authentication succeeds. The fingerprint is still used as an example, and a biometric feature of ALIPAY is the thumb fingerprint. When the application type information of ALIPAY is the same as or similar to the application type information of the Industrial and Commercial Bank of China online bank APP, the mobile terminal obtains an identity authentication fingerprint entered by the user. If the identity authentication fingerprint entered by the user is the thumb fingerprint, and the mobile terminal determines that the identity authentication fingerprint matches the thumb fingerprint, the mobile terminal sets the thumb fingerprint as the authentication fingerprint of the Industrial and Commercial Bank of China APP. A same biometric feature is entered to perform identity authentication, thereby improving accuracy of biometric feature registration performed by the mobile terminal, and avoiding a misoperation caused by directly setting the first biometric feature as the authentication biometric feature of the second application. In addition, the same biometric feature is entered to perform identity authentication, thereby improving security of biometric feature registration performed by the mobile terminal.

Further, in this embodiment, the method may further include Step 4073, where if the identity authentication biometric feature does not match the first biometric feature, present first user prompt information, where the first user prompt information is used to prompt the user to perform identity authentication. If the identity authentication fingerprint is an index finger fingerprint, and the identity authentication fingerprint does not match an authentication fingerprint, that is, a thumb fingerprint, of ALIPAY, the mobile terminal may not set the thumb fingerprint as the authentication fingerprint of the Industrial and Commercial Bank of China APP, but displays a prompt interface, to prompt the user to enter a correct identity authentication fingerprint, or prompts the user whether to perform identity authentication in another manner, such as a manner of entering a specific password or a specific gesture.

In an embodiment of the present disclosure, step 407 may be replaced with step 4074. If the type information of the first application matches the type information of the second application, present second user prompt information, where the second user prompt information is used to prompt the user whether to associate the first biometric feature with the second application. Step 4075, where obtain a confirmation instruction entered by the user, and associate the first biometric feature with the second application according to the confirmation instruction. That is, in this embodiment, the mobile terminal does not perform the step of user identity authentication, but performs the step of prompting the user to confirm information. The user prompt information is presented to prompt the user whether to set the first biometric feature as the authentication biometric feature of the second application such that the user can determine the authentication biometric feature of the second application according to a preference of the user, thereby improving biometric feature registration accuracy. The fingerprint is still used as an example. When the mobile terminal determines that the application type information of ALIPAY is the same as or similar to the application type information of the Industrial and Commercial Bank of China online bank APP, a dialog box pops up on a current interface and prompts the user whether to set the thumb fingerprint as the authentication fingerprint of the Industrial and Commercial Bank of China online bank APP, and the mobile terminal associates the thumb fingerprint with the Industrial and Commercial Bank of China online bank APP after obtaining the confirmation instruction of the user.

In all embodiments of the present disclosure, the user prompt information may be presented using a UI, or may be presented by the mobile terminal by means of vibration, or may be presented by means of ringing or the like. This is not limited herein.

In an embodiment of the present disclosure, step 407 may be replaced with step 4076. If the type information of the first application matches the type information of the second application, obtain an identity authentication biometric feature entered by the user, where the identity authentication biometric feature is used for identity authentication. Step 4077, where when the identity authentication biometric feature is a preset biometric feature, associate the first biometric feature with the second application. That is, in this embodiment, if the type information of the first application is the same as or similar to the type information of the second application, the mobile terminal does not directly set the first biometric feature as the authentication biometric feature of the second application, but first performs the step of user identity authentication. A difference between this embodiment and the embodiment that includes steps 4071 and 4072 is as follows. In the embodiment that includes steps 4071 and 4072, the biometric feature used for user identity authentication is the same biometric feature as the first biometric feature, and in the embodiment that includes steps 4076 and 4077, the biometric feature used for user identity authentication is the preset biometric feature, and may be the first biometric feature, or may be another biometric feature different from the first biometric feature, such as different types of biometric features, for example, the first biometric feature is a fingerprint, and the preset biometric feature is an iris, or such as different biometric features of a same type, for example, the first biometric feature is a thumb fingerprint, and the preset biometric feature is a middle finger fingerprint. The mobile terminal sets the first biometric feature as the authentication biometric feature of the second application after the user enters the preset biometric feature, that is, after identity authentication succeeds. The preset biometric feature is entered to perform identity authentication, thereby improving accuracy of biometric feature registration performed by the mobile terminal, and avoiding a misoperation caused by directly setting the first biometric feature as the authentication biometric feature of the second application. In addition, the preset biometric feature is used to perform identity authentication, thereby improving security of biometric feature registration performed by the mobile terminal. The fingerprint is still used as an example. When the application type information of ALIPAY is the same as or similar to the application type information of the Industrial and Commercial Bank of China online bank APP, the mobile terminal obtains an identity authentication fingerprint entered by the user. If an identity authentication fingerprint preset by the mobile terminal is a middle finger fingerprint, if an identity authentication fingerprint entered by the user in this case is a thumb fingerprint, the mobile terminal determines that the identity authentication fingerprint does not match the thumb fingerprint, and prompt information pops up for user confirmation, or if an identity authentication fingerprint entered by the user in this case is the middle finger fingerprint, the mobile terminal sets the thumb fingerprint as the authentication fingerprint of the Industrial and Commercial Bank of China APP.

A fingerprint is used as an example, and the foregoing embodiment includes the following. The mobile terminal obtains the fingerprint registration request of the ALIPAY application, obtains the thumb fingerprint entered by the user, and associates the thumb fingerprint with the ALIPAY application. The mobile terminal obtains a fingerprint registration request of an online bank application. The mobile terminal learns that type information of the ALIPAY application is a "financial type", learns that type information of the online bank application is the "financial type", and determines that the type information of the ALIPAY application matches the type information of the online bank application. In the embodiment that includes step 407, the mobile terminal sets the thumb fingerprint as an authentication fingerprint of the online bank application. In the embodiment that includes steps 4071 and 4072, the mobile terminal performs the operation of user identity authentication, for example, prompts the user to enter fingerprint information for user identity authentication, obtains the identity authentication fingerprint entered by the user, and sets the thumb fingerprint as the authentication fingerprint of the online bank application when a fingerprint entered by the user is the thumb fingerprint, that is, the fingerprint that is entered by the user for user identity authentication is the same fingerprint as a fingerprint associated with the ALIPAY application. If a fingerprint entered by the user is not the thumb fingerprint, the mobile terminal performs the embodiment that includes steps 4071, 4072, and 4073, that is, if the mobile terminal determines that the fingerprint that is entered by the user for user identity authentication is not the same fingerprint as a fingerprint associated with the ALIPAY application, the mobile terminal presents user prompt information, where the user prompt information is used to prompt the user to enter a correct fingerprint for identity authentication, or prompt the user to perform identity authentication in another manner. In the embodiment that includes step 4074 and step 4075, the mobile terminal presents user prompt information, where the user prompt information is used to prompt the user whether to set the thumb fingerprint as the authentication fingerprint of the online bank application, and sets the thumb fingerprint as the authentication fingerprint of the online bank application after obtaining the confirmation instruction of the user. In the embodiment that includes steps 4076 and 4077, the mobile terminal performs the operation of user identity authentication, for example, prompts the user to enter fingerprint information or iris information for user identity authentication, obtains an identity authentication fingerprint or an identity authentication iris entered by the user, and sets the thumb fingerprint as the authentication fingerprint of the online bank application when a fingerprint entered by the user is a preset fingerprint or a preset iris.

In an embodiment of the present disclosure, step 404 may be replaced with step 4041. Obtain a biometric feature association request that is entered by the user and that is for associating the second application with a second biometric feature. That is, the mobile terminal receives the biometric feature association request of the second application, obtains the second biometric feature entered by the user, and requests to use the second biometric feature as a biometric feature used by the second application for authentication in a use process. For example, the first application is ALIPAY, and the second application is an online bank application. The mobile terminal obtains a thumb fingerprint entered by the user, and associates the thumb fingerprint with the ALIPAY application. The mobile terminal obtains a middle finger fingerprint entered by the user, and obtains a request that is entered by the user and that is for setting the middle finger fingerprint as a fingerprint used by the online bank application for authentication in a use process. The mobile terminal obtains type information of the ALIPAY application and type information of the online bank application. If both the type information of the ALIPAY application and the type information of the online bank application include an attribute of a "financial type", the mobile terminal determines that the type information of the ALIPAY application matches the type information of the online bank application, and sets the thumb fingerprint as an authentication fingerprint of the ALIPAY application.

Further, in this embodiment, the method further includes step 408, where if the type information of the first application does not match the type information of the second application, set the second biometric feature as the authentication biometric feature of the second application. That is, the mobile terminal obtains a biometric registration request of the second application, obtains the second biometric feature entered by the user, obtains the type information of the second application, and sets the authentication biometric feature of the second application as the second biometric feature if the mobile terminal determines that the type information of the first application does not match the type information of the second application. For example, the first application is an online bank application, and the second application is TWITTER. The mobile terminal obtains an index finger fingerprint entered by the user, and associates the index finger fingerprint with the online bank application. The mobile terminal obtains a registration request that is entered by the user and that is for associating TWITTER with a middle finger fingerprint, learns that type information of the online bank application is a "financial type", learns that type information of TWITTER is a "social type", and learns that the type information of the online bank application does not match the type information of TWITTER, the mobile terminal associates the middle finger fingerprint with TWITTER, and sets the middle finger fingerprint as an authentication fingerprint of TWITTER.

Further, in this embodiment, step 407 may be replaced with 407B. If the type information of the first application matches the type information of the second application, present user prompt information, where the user prompt information is used to prompt the user whether to set the first biometric feature as the authentication biometric feature of the second application. Step 407C, where obtain a confirmation instruction entered by the user, and set the first biometric feature as the authentication biometric feature of the second application according to the confirmation instruction. That is, after the mobile terminal obtains a registration request for associating the second application with the first biometric feature, if the type information of the first application matches the type information of the second application, the mobile terminal does not directly set the first biometric feature as the authentication biometric feature of the second application, but presents the user prompt information to allow the user to determine whether to set the first biometric feature as the authentication biometric feature of the second application such that the user can set the authentication biometric feature of the second application according to a preference of the user, thereby improving user operation convenience and user experience. The confirmation instruction entered by the user may be obtained as follows. The user may enter the confirmation instruction on a UI, the user may trigger the confirmation instruction using a sensor, for example, by shaking a mobile phone, or the user may trigger the confirmation instruction by verifying a biometric feature, for example, enter a specific biometric feature for verification mentioned in the foregoing embodiment, and trigger the confirmation instruction after verification succeeds.

Figure 3:
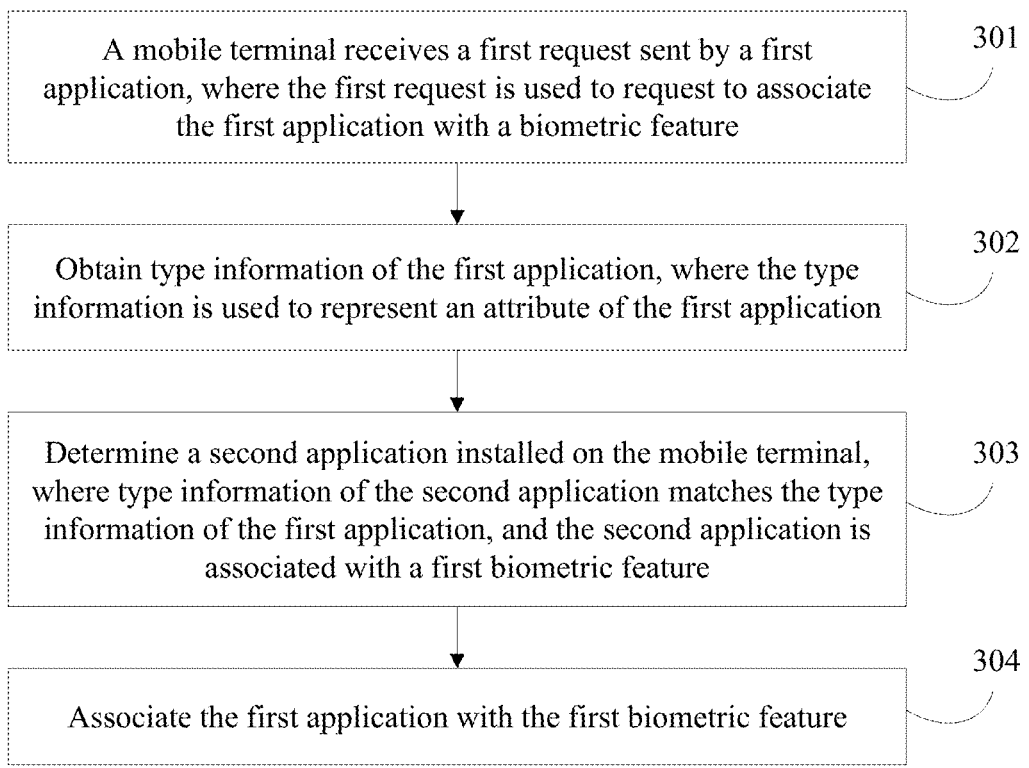
FIG. 3 shows a method for associating an application program with a biometric feature according to an embodiment of the present disclosure.
Figure 5:
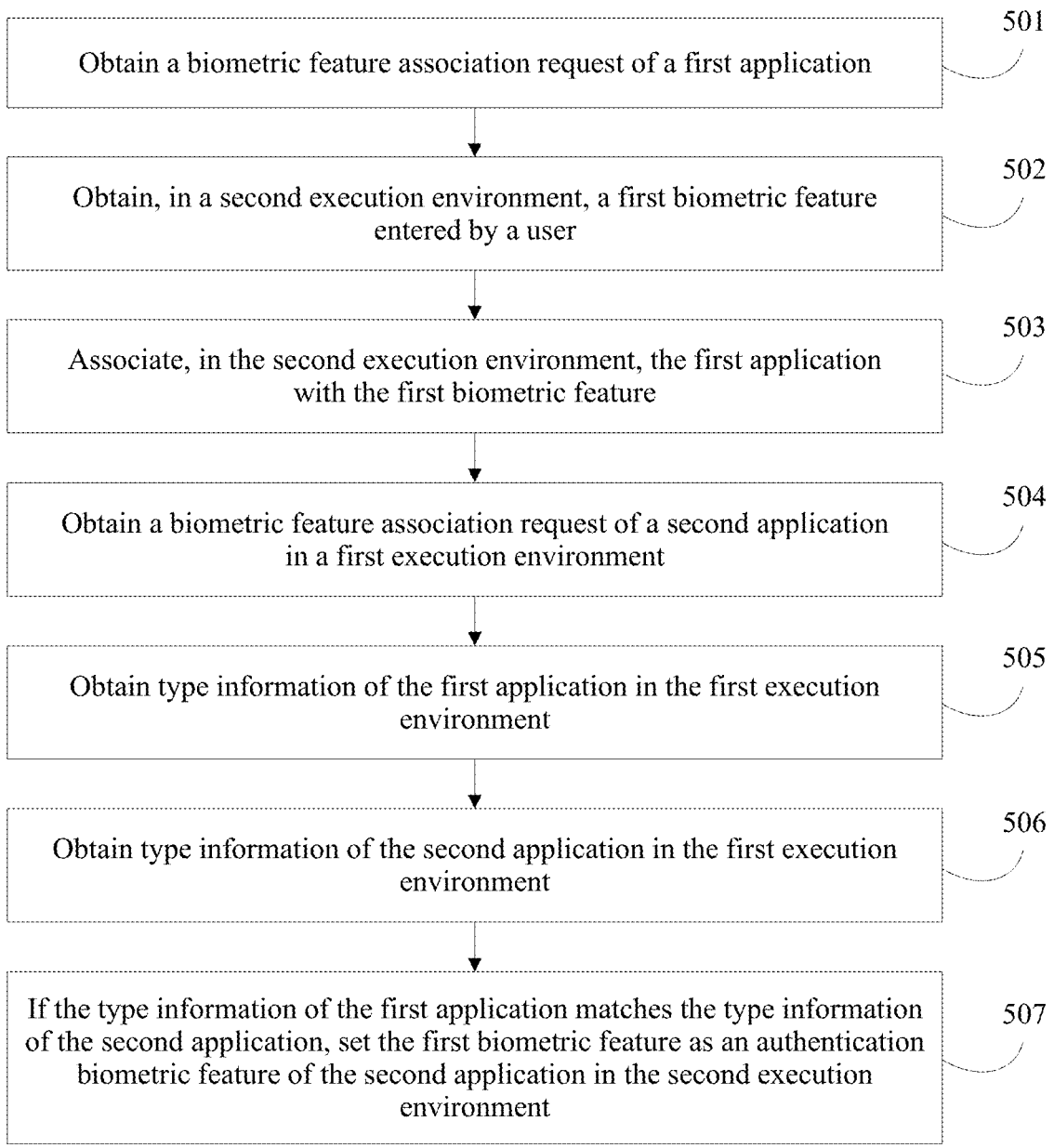
FIG. 5 shows a method for associating an application program with a biometric feature according to an embodiment of the present disclosure.

In an embodiment of the present disclosure, some steps of the embodiments in FIG. 3 and FIG. 4 may be performed in a first execution environment, and other steps may be performed in a second execution environment. Further, as shown in FIG. 5, based on the descriptions in FIG. 3 and FIG. 4, the following uses an example in which the first execution environment is an REE, and uses an example in which the second execution environment is a TEE. The method further includes the following steps.

Step 501. Obtain a biometric feature association request of a first application. A mobile terminal may obtain the biometric feature association request of the first application in an REE environment, for example, obtain a fingerprint registration request of ALIPAY in an ANDROID environment, or may obtain the biometric feature association request of the first application in a TEE environment, for example, obtain a fingerprint registration request of ALIPAY in the TEE environment.

Step 502. Obtain, in a second execution environment, a first biometric feature entered by a user. Further, the mobile terminal may obtain, in the TEE environment, a thumb fingerprint entered by the user.

Step 503. Associate the first application with the first biometric feature in the second execution environment. Further, the mobile terminal may associate ALIPAY with the thumb fingerprint in the TEE environment, and uses the thumb fingerprint as an authentication fingerprint of ALIPAY. For an association mechanism, refer to a mechanism defined in the standard shown in FIG. 2, that is, an API interface for fingerprint registration is provided in the TEE environment, and fingerprint registration is performed by invoking the interface.

Step 504. Obtain a biometric feature association request of a second application in the first execution environment. Further, the mobile terminal may obtain the biometric feature association request of the second application in the REE environment, for example, obtain a fingerprint registration request of an Industrial and Commercial Bank of China online bank APP in an ANDROID environment.

Step 505. Obtain type information of the first application in the first execution environment. Further, the type information of the first application comes from the first execution environment, such as an ANDROID or IOS system.

Step 506. Obtain type information of the second application in the first execution environment. Further, the type information of the second application comes from the first execution environment, such as an ANDROID or IOS system.

Likewise, steps 501, 502, 504, 505, and 506 may be or not be performed in sequence.

Step 507. If the type information of the first application matches the type information of the second application, set the first biometric feature as an authentication biometric feature of the second application in the second execution environment. Further, if type information of ALIPAY matches type information of the Industrial and Commercial Bank of China online bank APP, the mobile terminal sets, in the TEE environment, the thumb fingerprint associated with ALIPAY as an authentication fingerprint of the Industrial and Commercial Bank of China online bank APP.

In this embodiment of the present disclosure, execution environments of some steps are specified, and a step that is related to a secret or has relatively high confidentiality is performed in an execution environment with relatively high security. On the basis of implementing quick biometric feature association and improving association efficiency, biometric feature association security is improved, and user information disclosure is effectively prevented.

Figure 6:
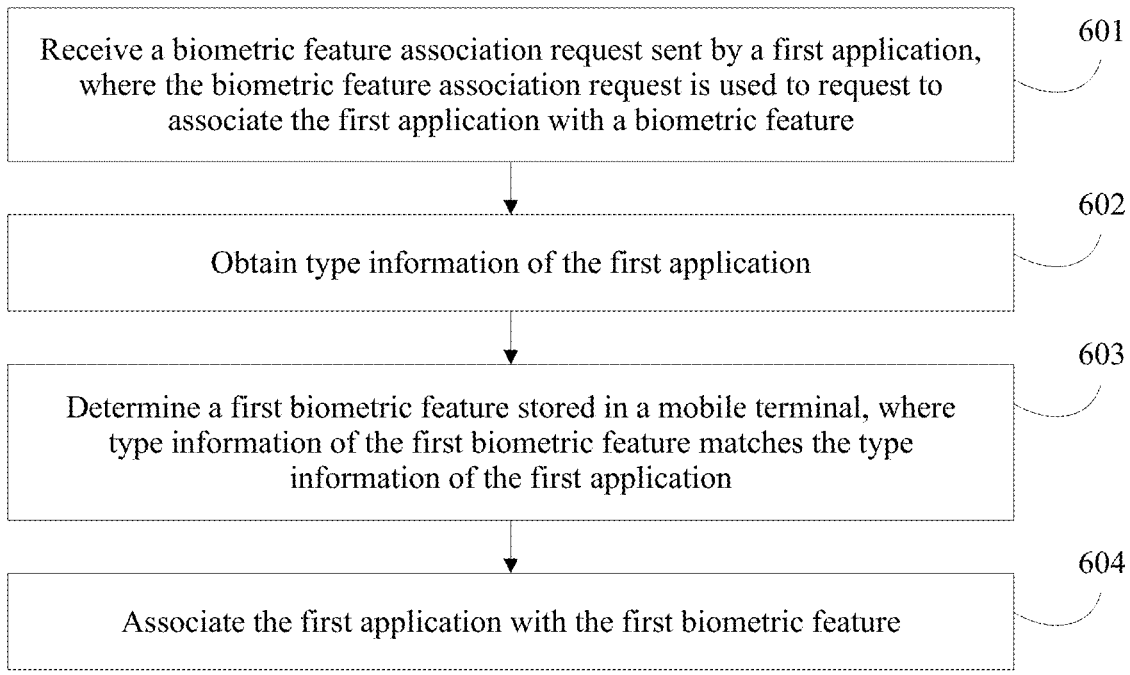
FIG. 6 shows a method for associating an application program with a biometric feature according to an embodiment of the present disclosure.

In an embodiment of the present disclosure, for the technical problem that when registering a fingerprint, a user needs to enter fingerprint images multiple times for a same application or a same type of applications, thereby resulting in an inconvenient user operation, relatively low registration efficiency, and poor user experience. As shown in FIG. 6, FIG. 6 is a method for associating an application program with a biometric feature according to an embodiment of the present disclosure. For a same or corresponding technical feature, reference may be made mutually between the method and the foregoing method embodiment. The method includes the following steps.

Step 601. Receive a biometric feature association request sent by a first application, where the biometric feature association request is used to request to associate the first application with a biometric feature. Refer to the description in step 401.

Step 602. Obtain type information of the first application. For details, refer to the description in step 405.

It should be noted that a sequence of performing steps 601 and 602 is not limited in this embodiment of the present disclosure.

Step 603. Determine a first biometric feature stored in a mobile terminal, where type information of the first biometric feature matches the type information of the first application. The type information may be set by a user when entering the first biometric feature. For example, when the user enters a thumb fingerprint, and the mobile terminal presents a type information prompt interface and prompts the user to set type information of the thumb fingerprint, the user sets the thumb fingerprint as an authentication fingerprint of a payment-type application. Alternatively, the type information may be pre-stored in the mobile terminal, that is, before the mobile terminal obtains a first request, the first biometric feature is already stored in the mobile terminal, and the type information of the first biometric feature is preset on the mobile terminal.

Optionally, the type information of the first biometric feature is used to indicate that the first biometric feature is used for authentication in a use process of which type of application. A fingerprint is used as an example. For example, the user sets type information of a thumb fingerprint as an authentication biometric feature of a payment-type application when entering the thumb fingerprint. After obtaining the thumb fingerprint, the mobile terminal may obtain the type information of the thumb fingerprint, and use the thumb fingerprint as an authentication fingerprint of the payment-type application such as ALIPAY or an Industrial and Commercial Bank of China online bank APP.

Optionally, the type information of the first biometric feature is used to indicate that the first biometric feature is used for authentication in a use process of which type of service. A fingerprint is used as an example. For example, the user sets type information of a thumb fingerprint as an authentication biometric feature of a payment-type service when entering the thumb fingerprint. After obtaining information about the thumb fingerprint, the mobile terminal may obtain the type information of the thumb fingerprint, and use the thumb fingerprint as an authentication fingerprint of the payment service such as a payment service of ALIPAY, a red packet service of WECHAT, a transfer service of WECHAT, a payment service of a group buying-type application, or a transfer service of an Industrial and Commercial Bank of China online bank APP.

It should be noted that the type information herein of the first biometric feature is used to indicate an application scenario of the first biometric feature, and is different from attribute information of the first biometric feature. In this embodiment of the present disclosure, the attribute information of the first biometric feature includes information about the first biometric feature, that is, what the first biometric feature is, such as a fingerprint or an iris. When the mobile terminal obtains the type information of the first biometric feature, the mobile terminal may obtain the attribute information of the first biometric feature, or may not obtain the attribute information of the first biometric feature. Alternatively, in some scenarios, the type information may include the attribute information, or in some scenarios, the type information may not include the attribute information.

The type information of the first application matches the type information of the first biometric feature. From a perspective of application type information, an application type of the first application is the same as or similar to an application type to which the first biometric feature is applicable, that is, the first application and an application to which the first biometric feature is applicable are applications of a same attribute. That the first biometric feature is a thumb fingerprint and the first application is ALIPAY is used as an example. The thumb fingerprint is an authentication fingerprint of a payment-type application, type information of ALIPAY is the payment-type application, and application types of the thumb fingerprint and ALIPAY are the same, that is, the thumb fingerprint may be set as an authentication fingerprint of ALIPAY.

The type information of the first application matches the type information of the first biometric feature. From a perspective of service type information, the first application includes a service to which the first biometric feature is applicable, that is, there is an intersection between a service of the first application and a service to which the first biometric feature is applicable. That the first biometric feature is a thumb fingerprint and the first application is ALIPAY is used as an example. The thumb fingerprint is an authentication fingerprint of a payment-type service, ALIPAY includes a payment service, and the thumb fingerprint and ALIPAY have a same service type, that is, the thumb fingerprint may be set as an authentication fingerprint of ALIPAY. Still alternatively, that the first biometric feature is a thumb fingerprint and the first application is a shopping-type application (for example, an Amazon client) is used as an example. The thumb fingerprint is an authentication fingerprint of a payment-type service, the shopping-type application includes a shopping service, a payment service, and the like, and the thumb fingerprint and the shopping-type application have a same service type, that is, the thumb fingerprint may be set as an authentication fingerprint of the shopping-type application.

Step 604. Associate the first application with the first biometric feature. If the type information of the first application matches the type information of the first biometric feature, the first biometric feature is set as an authentication biometric feature of the first application, where the authentication biometric feature is used by the first application to perform biometric feature authentication in a use process, such as identity authentication or functionality authentication.

Optionally, if the type information of the first application does not match the type information of the first biometric feature, the mobile terminal obtains a second biometric feature entered by the user, and sets the second biometric feature as an authentication biometric feature of the first application. That the first biometric feature is a thumb fingerprint and the first application is TWITTER is used as an example. The thumb fingerprint is an authentication fingerprint of a payment-type application, type information of TWITTER is a social-type application, and type information of the thumb fingerprint does not match the type information of TWITTER. In this case, the mobile terminal obtains the second biometric feature entered by the user, such as an index finger fingerprint, and sets the index finger fingerprint as an authentication fingerprint of TWITTER.

In this embodiment of the present disclosure, the type information of the first biometric feature and the type information of the first application are obtained, and whether to set the first biometric feature as an authentication biometric feature of the first application is determined based on whether the type information of the first biometric feature matches the type information of the first application such that a user can quickly perform quick biometric feature association on a same type of applications or applications that have a same service type, thereby improving biometric feature association efficiency.

In an embodiment of the present disclosure, step 604 may be replaced with step 6041, where obtain identity authentication information entered by the user, where the identity authentication information is used for identity authentication. Step 6042, where if it is determined, according to the identity authentication information, that identity authentication succeeds, associate the first application with the first biometric feature, and set the first biometric feature as the authentication biometric feature of the first application. That is, in this embodiment, if the type information of the first biometric feature matches the type information of the first application, the mobile terminal does not directly set the first biometric feature as the authentication biometric feature of the first application, but first performs the step of user identity authentication, and sets the first biometric feature as the authentication biometric feature of the first application after identity authentication succeeds. In a possible implementation, the identity authentication information may be a gesture entered by the user, for example, a specific sliding gesture performed on a touchscreen, and the sliding gesture is used for identity authentication. In a possible implementation, the identity authentication information may be a password entered by the user, for example, password information that is entered by the user and that represents a user identity. In a possible implementation, the identity authentication information may be a second biometric feature entered by the user, for example, a different type of biometric feature entered by the user, such as an iris, where the different type of biometric feature is used for identity authentication.

In an embodiment of the present disclosure, step 604 may be replaced with step 6043, where present first prompt information, where the first prompt information is used to prompt the user whether to associate the first application with the first biometric feature. Step 6044, where obtain a confirmation instruction entered by the user, associate the first application with the first biometric feature according to the confirmation instruction, and set the first biometric feature as the authentication biometric feature of the first application. That is, in this embodiment, the mobile terminal performs the step of prompting the user to confirm information. The user prompt information is presented to prompt the user whether to set the first biometric feature as the authentication biometric feature of the first application such that the user can determine the authentication biometric feature of the first application according to a preference of the user, thereby improving biometric feature registration accuracy. The user prompt information may be presented using a UI, or may be presented by the mobile terminal by means of vibration, or may be presented by means of ringing or the like. This is not limited herein.

In an embodiment of the present disclosure, some steps of the embodiment in FIG. 6 may be performed in a first execution environment, and other steps may be performed in a second execution environment. Further, based on the description of the embodiment in FIG. 6, the following uses an example in which the first execution environment is an REE, and uses an example in which the second execution environment is a TEE. The method further includes that the mobile terminal obtains a biometric feature association request of the first application in the REE, for example, obtains a fingerprint registration request of an ALIPAY application in the REE. The mobile terminal obtains the type information of the first application in the REE, for example, in an ANDROID or IOS system environment, obtains type information of ALIPAY, and determines that ALIPAY is a payment-type application. The mobile terminal searches for a stored first biometric feature, and for example, learns that a thumb fingerprint and a middle finger fingerprint are stored in the terminal. The mobile terminal determines whether the type information of the first application matches the type information of the first biometric feature, and if the type information of the first application matches the type information of the first biometric feature, the mobile terminal associates the first application with the first biometric feature in the TEE, and sets the first biometric feature as the authentication biometric feature of the first application. For example, if the terminal learns that the thumb fingerprint is a payment-type fingerprint, and the middle finger fingerprint is a game-type fingerprint, the mobile terminal determines that type information of ALIPAY matches type information of the thumb fingerprint, and sets the thumb fingerprint as an authentication fingerprint of ALIPAY in the TEE.

Figure 7:
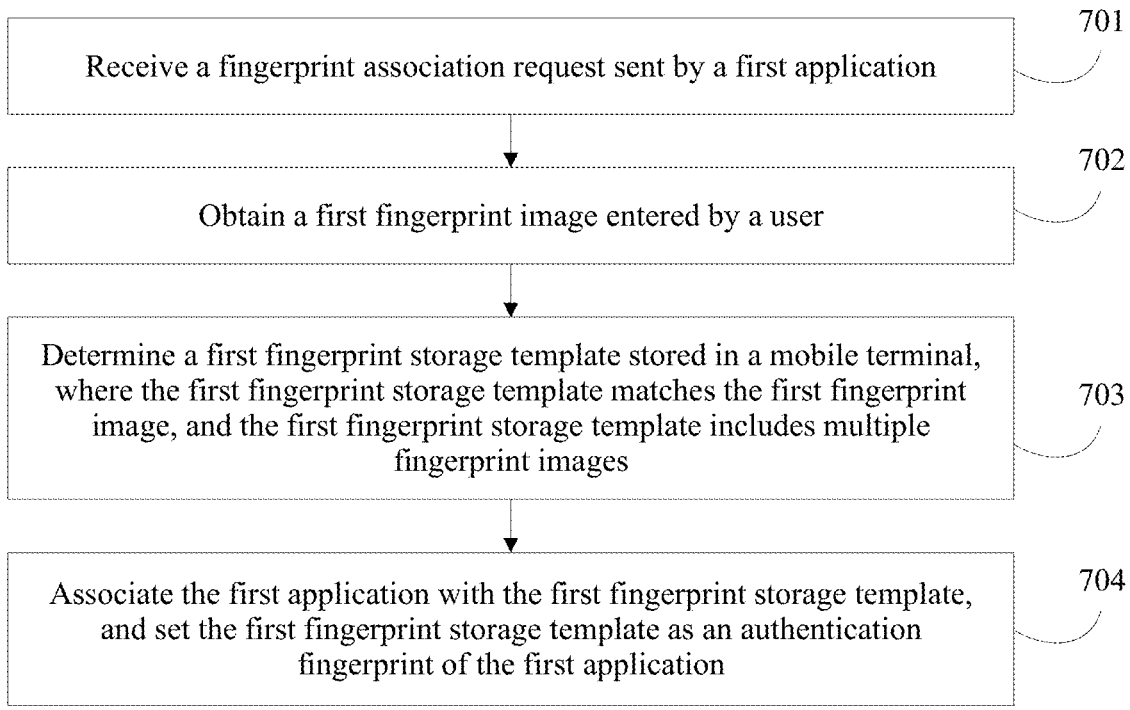
FIG. 7 shows a method for associating an application program with a biometric feature according to an embodiment of the present disclosure.

In an embodiment of the present disclosure, for the technical problem that when registering a fingerprint, a user needs to enter fingerprint images multiple times, thereby resulting in an inconvenient user operation, relatively low registration efficiency, and poor user experience. As shown in FIG. 7, an embodiment of the present disclosure provides a method for associating an application program with a biometric feature. For this embodiment of the present disclosure, refer to a same or corresponding technical feature in the foregoing embodiment. The method includes the following steps Step 701. Receive a fingerprint association request sent by a first application, where the fingerprint association request is used to request to associate the first application with a fingerprint. For details, refer to the description in step 401.

Step 702. Obtain a first fingerprint image entered by a user. In other approaches, when the user registers a fingerprint, the user needs to enter fingerprint images of a to-be-registered finger multiple times, and a mobile terminal verifies whether the fingerprint images entered by the user multiple times match each other, and whether the fingerprint images belong to a same fingerprint in order to perform registration. In this embodiment of the present disclosure, the mobile terminal obtains only a fingerprint image entered by the user for the first time, that is, the first fingerprint image, and may not require the user to perform the operation of entering a same finger fingerprint multiple times.

Step 703. Determine a first fingerprint storage template stored in a mobile terminal, where the first fingerprint storage template matches the first fingerprint image, and the first fingerprint storage template includes multiple fingerprint images. Referring to the foregoing description of the storage template, a fingerprint storage template may be considered as a fingerprint. Multiple fingerprint images are pre-stored in the fingerprint storage template, where the multiple fingerprint images are fingerprint images of a same fingerprint that are entered from different angles, different fingerprint surfaces of the same finger, different contact surfaces between a finger fingerprint and a fingerprint sensor, and the like. The multiple fingerprint images may be multiple fingerprint images entered by the user during previous fingerprint entering. One or more fingerprint storage templates may be preset in the mobile terminal.

After obtaining the first fingerprint image, the mobile terminal may compare the fingerprint image with a preset fingerprint storage template. For example, multiple fingerprint storage templates, such as a fingerprint storage template of a thumb, a fingerprint storage template of an index finger, and a fingerprint storage template of a middle finger, are preset in the mobile terminal. A fingerprint storage template of each finger includes multiple fingerprint images, and the multiple fingerprint images may be fingerprint images entered during fingerprint storage template registration. The mobile terminal obtains the first fingerprint image, and the first fingerprint image is a fingerprint image of a thumb. The mobile terminal compares the fingerprint image of the thumb with multiple preset fingerprint storage templates to obtain a matched fingerprint storage template, that is, a fingerprint storage template of the thumb.

Step 704. Associate the first application with the first fingerprint storage template, and set the first fingerprint storage template as an authentication fingerprint of the first application. For details, refer to the description in step 407 in the foregoing embodiment.

In a possible implementation, if the mobile terminal does not obtain a fingerprint storage template that matches the first fingerprint image, that is, the mobile terminal does not store the first fingerprint storage template, the mobile terminal obtains a second fingerprint image entered by the user for the second time, where the first fingerprint image and the second fingerprint image are two fingerprint images of a same fingerprint, and generates the authentication fingerprint of the first application according to the first fingerprint image and the second fingerprint image. For example, multiple fingerprint storage templates, such as a fingerprint storage template of a thumb, a fingerprint storage template of an index finger, and a fingerprint storage template of a middle finger, are preset in the mobile terminal. The mobile terminal obtains the first fingerprint image, and the first fingerprint image is a fingerprint image of a little finger. The mobile terminal compares the fingerprint image of the little finger with the multiple preset fingerprint storage templates, and determines that there is no fingerprint storage template that matches the fingerprint image of the little finger. The mobile terminal obtains a fingerprint image of the little finger entered by the user for the second time, and according to the fingerprint image of the little finger entered for the first time and the fingerprint image of the little finger entered for the second time, generates a little finger fingerprint or a fingerprint storage template of the little finger, and sets the little finger fingerprint as the authentication fingerprint of the first application.

In this embodiment of the present disclosure, the user enters a fingerprint image only once when registering a fingerprint. After obtaining the fingerprint image entered once, the mobile terminal may compare the fingerprint image with a stored fingerprint storage template, and set a matched fingerprint storage template as an authentication fingerprint of a to-be-registered application, thereby achieving an effect that the user can successfully perform fingerprint registration by entering the fingerprint image once, improving fingerprint association efficiency, and improving user experience.

In an implementation of this embodiment of the present disclosure, before step 704, the method further includes obtaining identity authentication information entered by the user, where the identity authentication information is information used for identity authentication. Step 704 includes that if it is determined, according to the identity authentication information, that identity authentication succeeds, associating the first application with the first fingerprint storage template. The identity authentication information may be a gesture entered by the user, or may be a password entered by the user, or may be a biometric feature entered by the user. For details, refer to the descriptions in steps 6041 and 6042.

In an implementation of this embodiment of the present disclosure, before step 704, the method further includes presenting user prompt information, where the user prompt information is used to prompt the user whether to set the first fingerprint storage template as the authentication fingerprint of the first application. Step 704 includes obtaining a confirmation instruction entered by the user, and associating the first application with the first fingerprint storage template according to the confirmation instruction. For details, refer to the descriptions in steps 6043 and 6044.

Figure 8:
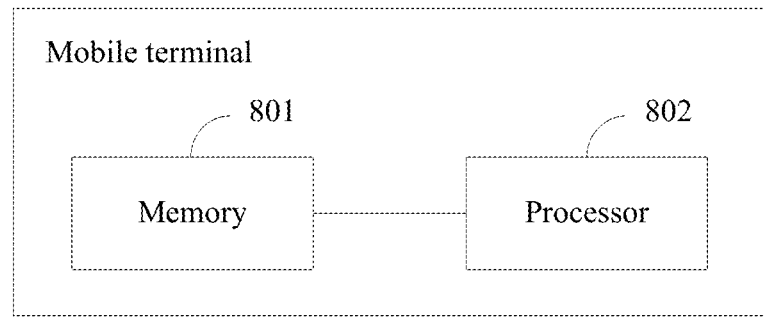
FIG. 8 is a schematic structural diagram of a mobile terminal according to an embodiment of the present disclosure.

As shown in FIG. 8, FIG. 8 is a schematic structural diagram of a mobile terminal according to an embodiment. For the mobile terminal, refer to the mobile terminal structure shown in FIG. 1, and the mobile terminal may be configured to perform the methods shown in FIG. 3, FIG. 4 and FIG. 5. For a same or corresponding technical feature, reference may be made mutually. Further, one or more processors 802 and a memory 801 are included. The processor 802 is connected to the memory 801. The memory 801 is configured to store one or more application programs, and the processor 802 runs the one or more application programs, and is configured to receive a first request sent by a first application, where the first request is used to request to associate the first application with a biometric feature, obtain type information of the first application, determine a second application installed on the mobile terminal, where type information of the second application matches the type information of the first application, and the second application is associated with a first biometric feature, and associate the first application with the first biometric feature. In this embodiment of the present disclosure, type information of an application is obtained, another application whose type information matches the type information of the application is determined according to the type information, and a biometric feature associated with the other application is associated with the application, thereby implementing quick biometric feature association, and improving biometric feature association efficiency.

In an embodiment, the mobile terminal further includes an input device (not shown). The input device is configured to obtain an identity authentication biometric feature entered by a user, where the identity authentication biometric feature is a biometric feature used for identity authentication, and the processor 802 is further configured to, if the identity authentication biometric feature matches a preset biometric feature, associate the first application with the first biometric feature. Further, the preset biometric feature is the first biometric feature. Still further, the mobile terminal further includes an output device (not shown). The output device is configured to, if the identity authentication biometric feature does not match the preset biometric feature, present second prompt information, where the second prompt information is used to prompt the user to perform identity authentication.

In an embodiment, the mobile terminal further includes an input device (not shown). The input device is configured to obtain a first instruction entered by the user, where the first instruction is used to request to associate the first application with a second biometric feature, and the processor 802 is configured to receive the first request sent by the first application, where the first request is used to request to associate the first application with the second biometric feature. The processor 802 is further configured to, if the second application is not installed on the mobile terminal, associate the first application with the second biometric feature.

In an embodiment, the mobile terminal further includes an output device (not shown) and an input device (not shown). The output device is configured to, before the processor 802 associates the first application with the first biometric feature, present first prompt information, where the first prompt information is used to prompt the user whether to set the first biometric feature as an authentication biometric feature of the first application, the input device is configured to obtain a confirmation instruction entered by the user, and the processor 802 is further configured to associate the first application with the first biometric feature according to the confirmation instruction.

In the foregoing embodiment, the processor 802 is further configured to obtain a semantic feature value of the first application, and that type information of the second application matches the type information of the first application includes that a semantic feature value of the second application is the same as or similar to the semantic feature value of the first application.

In the foregoing embodiment, the processor 802 is configured to receive, in a first execution environment, the first request sent by the first application, obtain the type information of the first application in the first execution environment, and associate the first application with the first biometric feature in a second execution environment.

In an embodiment, the mobile terminal shown in FIG. 8 may be further configured to perform the method shown in FIG. 6. For a same or corresponding technical feature, reference may be made mutually. Further, one or more processors and a memory are included. The processor is connected to the memory. The memory is configured to store one or more application programs, and the processor runs the one or more application programs, and is configured to receive a first request sent by a first application, where the first request is used to request to associate the first application with a biometric feature, obtain type information of the first application, determine a first biometric feature stored in the mobile terminal, where type information of the first biometric feature matches the type information of the first application, and associate the first application with the first biometric feature. In this embodiment of the present disclosure, the type information of the first biometric feature and the type information of the first application are obtained, and whether to set the first biometric feature as an authentication biometric feature of the first application is determined based on whether the type information of the first biometric feature matches the type information of the first application such that a user can quickly perform quick biometric feature association on a same type of applications or applications that have a same service type, thereby improving biometric feature association efficiency.

In an embodiment, the mobile terminal further includes an input device. The input device is configured to, before the processor associates the first application with the first biometric feature, obtain identity authentication information entered by a user, where the identity authentication information is information used for identity authentication, and the processor is further configured to perform identity authentication according to the identity authentication information, and if identity authentication succeeds, associate the first application with the first biometric feature. Further, that the input device obtains identity authentication information entered by a user further includes at least one of the following operations The input device obtains a gesture entered by the user, the input device obtains a password entered by the user, or the input device obtains a second biometric feature entered by the user.

In an embodiment, the mobile terminal further includes an output device and an input device. The output device is configured to, before the processor associates the first application with the first biometric feature, present first prompt information, where the first prompt information is used to prompt the user whether to associate the first application with the first biometric feature, the input device is configured to obtain a confirmation instruction entered by the user, and the processor is further configured to associate the first application with the first biometric feature according to the confirmation instruction.

In an embodiment, the processor is further configured to receive, in a first execution environment, the first request sent by the first application, obtain the type information of the first application in the first execution environment, and associate the first application with the first biometric feature in a second execution environment.

In an embodiment, the mobile terminal further includes an input device. The processor is further configured to determine that the memory does not store the first biometric feature, the input device is configured to obtain a second biometric feature entered by the user, and the processor is further configured to associate the first application with the second biometric feature.

Figure 9:
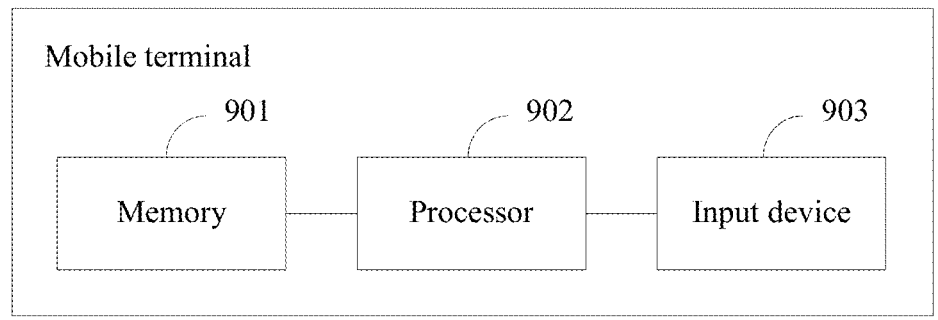
FIG. 9 is a schematic structural diagram of a mobile terminal according to an embodiment of the present disclosure.

As shown in FIG. 9, FIG. 9 is a schematic structural diagram of a mobile terminal according to an embodiment. For the mobile terminal, refer to the mobile terminal structure shown in FIG. 1, and the mobile terminal may be configured to perform the method shown in FIG. 7. For a same or corresponding technical feature, reference may be made mutually. Further, one or more processors 902, a memory 901, and an input device 903 are included. The processor 902 is connected to the memory 901, and the processor 902 is connected to the input device 903. The memory 901 is configured to store one or more application programs, the processor 902 runs the one or more application programs, and is configured to receive a first request sent by a first application, where the first request is used to request to associate the first application with a biometric feature, the input device 903 is configured to obtain a first fingerprint image entered by a user, and the processor 902 is further configured to determine a first fingerprint storage template stored in the memory, where the first fingerprint storage template matches the first fingerprint image, and the first fingerprint storage template includes multiple fingerprint images, and associate the first application with the first fingerprint storage template. In this embodiment of the present disclosure, the user enters a fingerprint image only once when registering a fingerprint. After obtaining the fingerprint image entered once, the mobile terminal may compare the fingerprint image with a stored fingerprint storage template, and set a matched fingerprint storage template as an authentication fingerprint of a to-be-registered application, thereby achieving an effect that the user can successfully perform fingerprint registration by entering the fingerprint image once, improving fingerprint association efficiency, and improving user experience.

In an embodiment, the input device 903 is further configured to, before the processor 902 associates the first application with the first fingerprint storage template, obtain identity authentication information entered by the user, where the identity authentication information is information used for identity authentication, and the processor 902 is configured to perform identity authentication according to the identity authentication information, and after determining that identity authentication succeeds, associate the first application with the first fingerprint storage template. Further, that the input device 903 obtains identity authentication information entered by the user includes at least one of the following operations. The input device 903 obtains a gesture entered by the user, the input device 903 obtains a password entered by the user, or the input device 903 obtains a biometric feature entered by the user.

In an embodiment, the mobile terminal further includes an output device (not shown). The output device is configured to, before the processor 902 associates the first application with the first fingerprint storage template, present first prompt information, where the first prompt information is used to prompt the user whether to associate the first application with the first fingerprint storage template, the input device 903 is further configured to obtain a confirmation instruction entered by the user, and the processor 902 is further configured to associate the first application with the first fingerprint storage template according to the confirmation instruction.

In an embodiment, if the memory 901 does not store the first fingerprint storage template, the input device 903 is further configured to obtain a second fingerprint image entered by the user, where the first fingerprint image and the second fingerprint image are two fingerprint images of a same fingerprint, and the processor 903 is further configured to generate an authentication fingerprint of the first application according to the first fingerprint image and the second fingerprint image.

Figure 10:
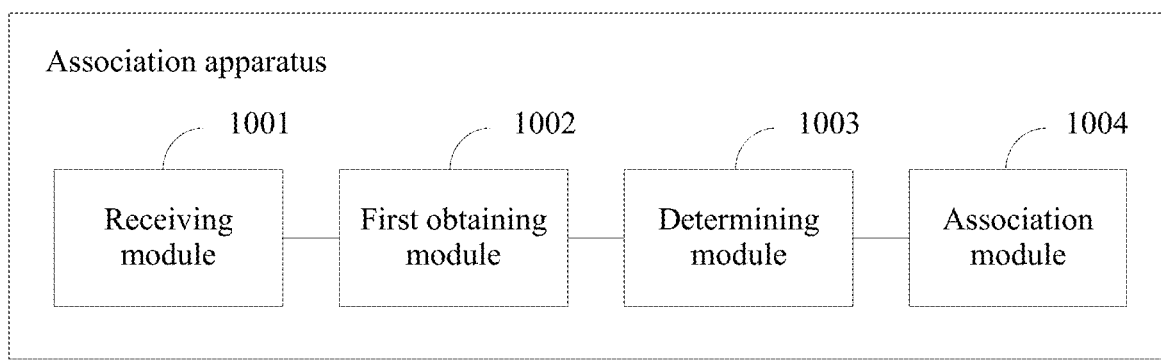
FIG. 10 is a schematic structural diagram of an association apparatus according to an embodiment of the present disclosure.

As shown in FIG. 10, FIG. 10 is a schematic structural diagram of an association apparatus according to an embodiment. The association apparatus may be configured to perform the methods shown in FIG. 3, FIG. 4 and FIG. 5. For a same or corresponding technical feature, reference may be made mutually. Further, the apparatus includes a receiving module 1001 configured to receive a first request sent by a first application, where the first request is used to request to associate the first application with a biometric feature, a first obtaining module 1002 configured to obtain type information of the first application, a determining module 1003 configured to determine a second application installed on a mobile terminal, where type information of the second application matches the type information of the first application, and the second application is associated with a first biometric feature, and an association module 1004 configured to associate the first application with the first biometric feature. In this embodiment of the present disclosure, type information of an application is obtained, another application whose type information matches the type information of the application is determined according to the type information, and a biometric feature associated with the other application is associated with the application, thereby implementing quick biometric feature association, and improving biometric feature association efficiency.

Figure 11:
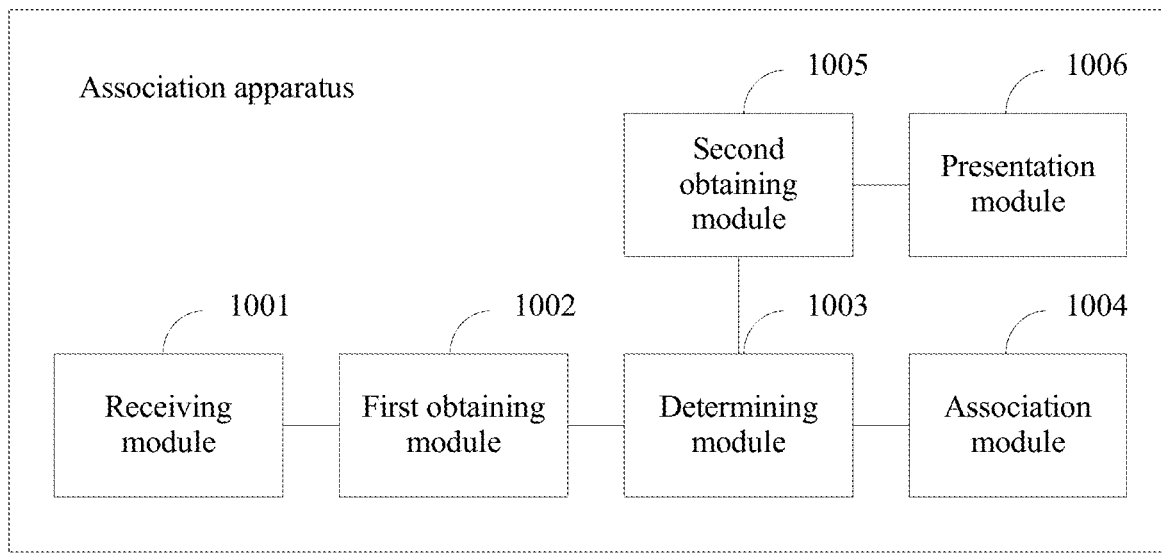
FIG. 11 is a schematic structural diagram of an association apparatus according to an embodiment of the present disclosure.

In an embodiment, based on the association apparatus shown in FIG. 10, referring to an association apparatus shown in FIG. 11, the apparatus further includes a second obtaining module 1005. The second obtaining module 1005 is configured to, before the association module 1004 associates the first application with the first biometric feature, obtain an identity authentication biometric feature entered by a user, where the identity authentication biometric feature is a biometric feature used for identity authentication, and the association module 1004 is further configured to, if the identity authentication biometric feature matches a preset biometric feature, associate the first application with the first biometric feature. Optionally, the preset biometric feature is the first biometric feature. The association apparatus further includes a presentation module 1006. The presentation module 1006 is configured to, if the identity authentication biometric feature does not match the preset biometric feature, present second prompt information, where the second prompt information is used to prompt the user to perform identity authentication.

In an embodiment, the receiving module 1001 is further configured to obtain a first instruction entered by the user, where the first instruction is used to request to associate the first application with a second biometric feature, and receive the first request sent by the first application, where the first request is further used to request to associate the first application with the second biometric feature. The association apparatus is further configured to, if the second application is not installed on the mobile terminal, associate the first application with the second biometric feature.

In an embodiment, the association apparatus further includes a first presentation module (not shown) and a third obtaining module (not shown). The first presentation module is configured to, before the association module 1004 associates the first application with the first biometric feature, present first prompt information, where the first prompt information is used to prompt the user whether to set the first biometric feature as an authentication biometric feature of the first application, the third obtaining module is configured to obtain a confirmation instruction entered by the user, and the association module 1004 is further configured to associate the first application with the first biometric feature according to the confirmation instruction.

In an embodiment, the first obtaining module 1002 is further configured to obtain a semantic feature value of the first application, and that type information of the second application matches the type information of the first application includes that a semantic feature value of the second application is the same as or similar to the semantic feature value of the first application.

In an embodiment, the receiving module 1001 is further configured to receive, in a first execution environment, the first request sent by the first application, the first obtaining module 1002 is further configured to obtain the type information of the first application in the first execution environment, and the association module 1004 is further configured to associate the first application with the first biometric feature in a second execution environment.

In an embodiment, the association apparatus shown in FIG. 10 may be further configured to perform the method shown in FIG. 6. For a same or corresponding technical feature, reference may be made mutually. The apparatus includes a receiving module configured to receive a first request sent by a first application, where the first request is used to request to associate the first application with a biometric feature, a first obtaining module configured to obtain type information of the first application, a determining module configured to determine a first biometric feature stored in a mobile terminal, where type information of the first biometric feature matches the type information of the first application, and an association module configured to associate the first application with the first biometric feature. In this embodiment of the present disclosure, the type information of the first biometric feature and the type information of the first application are obtained, and whether to set the first biometric feature as an authentication biometric feature of the first application is determined based on whether the type information of the first biometric feature matches the type information of the first application such that a user can quickly perform quick biometric feature association on a same type of applications or applications that have a same service type, thereby improving biometric feature association efficiency.

In an embodiment, the association apparatus further includes a second obtaining module. The second obtaining module is configured to, before the association module associates the first application with the first biometric feature, obtain identity authentication information entered by a user, where the identity authentication information is information used for identity authentication, and the association module is further configured to, if it is determined, according to the identity authentication information, that identity authentication succeeds, associate the first application with the first biometric feature. Optionally, the second obtaining module is further configured to perform at least one of the following operations of obtain a gesture entered by the user, obtain a password entered by the user, or obtain a second biometric feature entered by the user.

In an embodiment, the association apparatus further includes a first presentation module and a third obtaining module. The first presentation module is configured to, before the association module associates the first application with the first biometric feature, present first prompt information, where the first prompt information is used to prompt the user whether to associate the first application with the first biometric feature, the third obtaining module is configured to obtain a confirmation instruction entered by the user, and the association module is further configured to associate the first application with the first biometric feature according to the confirmation instruction.

In the foregoing embodiment, the receiving module is further configured to receive, in a first execution environment, the first request sent by the first application, the first obtaining module is further configured to obtain the type information of the first application in the first execution environment, and the association module is further configured to associate the first application with the first biometric feature in a second execution environment.

In the foregoing embodiment, the association apparatus further includes a fourth obtaining module. The fourth obtaining module is configured to, if the first biometric feature is not installed on the mobile terminal, obtain a second biometric feature entered by the user, and the association module is further configured to associate the first application with the second biometric feature.

In an embodiment, the association apparatus shown in FIG. 10 may be further configured to perform the method shown in FIG. 7. For a same or corresponding technical feature, reference may be made mutually. The association apparatus includes a receiving module configured to receive a first request sent by a first application, where the first request is used to request to associate the first application with a biometric feature, a first obtaining module configured to obtain a first fingerprint image entered by a user, a determining module configured to determine a first fingerprint storage template stored in a mobile terminal, where the first fingerprint storage template matches the first fingerprint image, and the first fingerprint storage template includes multiple fingerprint images, and an association module configured to associate the first application with the first fingerprint storage template. In this embodiment of the present disclosure, the user enters a fingerprint image only once when registering a fingerprint. After obtaining the fingerprint image entered once, the mobile terminal may compare the fingerprint image with a stored fingerprint storage template, and set a matched fingerprint storage template as an authentication fingerprint of a to-be-registered application, thereby achieving an effect that the user can successfully perform fingerprint registration by entering the fingerprint image once, improving fingerprint association efficiency, and improving user experience.

In an embodiment, the association apparatus further includes a second obtaining module. The second obtaining module is configured to, before the association module associates the first application with the first fingerprint storage template, obtain identity authentication information entered by the user, where the identity authentication information is information used for identity authentication, and the association module is further configured to if it is determined, according to the identity authentication information, that identity authentication succeeds, associate the first application with the first fingerprint storage template. Optionally, the second obtaining module is further configured to perform at least one of the following operations of obtain a gesture entered by the user, obtain a password entered by the user, or obtain a biometric feature entered by the user.

In an embodiment, the association apparatus further includes a first presentation module and a third obtaining module. The first prompt module is configured to, before the association module associates the first application with the first fingerprint storage template, present first prompt information, where the first prompt information is used to prompt the user whether to associate the first application with the first fingerprint storage template, the third obtaining module is configured to obtain a confirmation instruction entered by the user, and the association module is further configured to associate the first application with the first fingerprint storage template according to the confirmation instruction.

In an embodiment, the association apparatus further includes a fourth obtaining module and a generation module. The fourth obtaining module is configured to obtain a second fingerprint image entered by the user, where the first fingerprint image and the second fingerprint image are two fingerprint images of a same fingerprint, and the generation module is configured to generate an authentication fingerprint of the first application according to the first fingerprint image and the second fingerprint image.

An embodiment of the present disclosure further provides a computer readable storage medium that stores one or more programs, where the one or more programs include an instruction, and when being executed by a mobile terminal that includes multiple application programs, the instruction enables the mobile terminal to perform the method according to the embodiment shown in any one of FIG. 3, FIG. 4, FIG. 5, FIG. 6, and FIG. 7.

It should be noted that, in the embodiments of the present disclosure, descriptions such as "first" and "second" are only used to distinguish between described objects, and do not have actual meanings. A portable electronic device is equivalent to a mobile terminal.

Functional modules in the embodiments of the present disclosure may be integrated into one processing unit module, or each of the modules may exist alone physically, or two or more modules are integrated into one module. The integrated module may be implemented in a form of hardware, or may be implemented in a form of hardware in addition to a software functional unit.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the apparatus, refer to a corresponding process in the method embodiment. An implementation principle and a technical effect of the apparatus are similar to those of the method embodiment, and a same or corresponding technical feature is not described herein again.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A mobile terminal, comprising:
   a memory configured to store one or more application programs; and
   a processor coupled to the memory, wherein the one or more application programs cause the processor to be configured to:
   receive a first request to associate a first application with a first biometric feature;
   obtain type information of the first application by performing semantic analysis on features of the first application;
   determine a second application installed on the mobile terminal that matches the type information of the first application, wherein the second application is associated with a second biometric feature;
   display, in response to the second application matching the type information of the first application, user prompt information, wherein the user prompt information prompts a user whether to set the second biometric feature as an authentication feature of the first application; and
   associate, in response to receiving a user confirmation entered by the user, the first application with the second biometric feature such that both the first application and the second application use the second biometric feature to perform authentication.

2. The mobile terminal of claim 1, further comprising an input device coupled to the processor and configured to obtain an identity authentication biometric feature from the user, wherein the identity authentication biometric feature comprises a biometric feature used for identity authentication, and wherein the one or more application programs further cause the processor to be configured to associate the first application with the second biometric feature when the identity authentication biometric feature matches a preset biometric feature.

3. The mobile terminal of claim 2, wherein the preset biometric feature comprises the second biometric feature.

4. The mobile terminal of claim 1, further comprising an input device coupled to the processor and configured to obtain a first instruction requesting to associate the first application with a third biometric feature from the user, wherein the one or more application programs further cause the processor to be configured to receive the first request from the first application, and wherein the first request requests to associate the first application with the third biometric feature.

5. The mobile terminal of claim 2, further comprising an output device coupled to the processor, wherein the processor and the input device are configured to present second prompt information when the identity authentication biometric feature does not match the preset biometric feature, and wherein the second prompt information prompts the user to perform the identity authentication.

6. The mobile terminal of claim 1, wherein the one or more application programs further cause the processor to be configured to obtain a semantic feature value of the first application, and wherein the type information of the second application matching the type information of the first application comprises a semantic feature value of the second application is the same as the semantic feature value of the first application.

7. The mobile terminal of claim 1, wherein the one or more application programs further cause the processor to be configured to:
   receive, in a first execution environment, the first request from the first application;
   obtain the type information of the first application in the first execution environment; and
   associate the first application with the second biometric feature in a second execution environment.

8. The mobile terminal of claim 1, wherein the one or more application programs further cause the processor to be configured to obtain a semantic feature value of the first application, and wherein the type information of the second application matching the type information of the first application comprises a semantic feature value of the second application being similar to the semantic feature value of the first application.

9. The mobile terminal of claim 1, wherein the user prompt information is displayed in a user interface display, wherein the user prompt information prompts the user to enter a specific biometric feature for verification before associating the first application with the second biometric feature, and wherein the one or more application programs further cause the processor to be configured to:
   receive the specific biometric feature from the user;
   verify the user using the specific biometric feature; and associate, in response to receiving the specific biometric feature from the user and verifying the user, the first application with the second biometric feature.

10. A mobile terminal, comprising:
a memory configured to store one or more application programs; and
one or more processors coupled to the memory, wherein the one or more application programs cause the one or more processors to be configured to:
receive a first request to associate a first application with a first biometric feature;
obtain type information of the first application by performing semantic analysis on features of the first application;
determine a second biometric feature stored in the mobile terminal, wherein type information of the second biometric feature matches the type information of the first application;
display, in response to the type information of the second biometric feature matching the type information of the first application, user prompt information, wherein the user prompt information prompts a user whether to set the second biometric feature as an authentication feature of the first application; and
associate, in response to receiving a user confirmation entered by the user, the first application with the second biometric feature such that the first application uses the second biometric feature to perform authentication.

11. The mobile terminal of claim 10, further comprising an input device coupled to the one or more processors and configured to obtain identity authentication information from the user before the one or more processors associate the first application with the second biometric feature, wherein the identity authentication information comprises information used for identity authentication, and wherein the one or more application programs further cause the one or more processors to be configured to:
perform the identity authentication according to the identity authentication information; and
associate the first application with the second biometric feature when the identity authentication succeeds.

12. The mobile terminal of claim 11, wherein when obtaining the identity authentication information from the user, the input device is configured to perform at least one of:
obtain a gesture from the user;
obtain a password from the user; or
obtain a third biometric feature from the user.

13. The mobile terminal of claim 10, wherein the one or more application programs further cause the one or more processors to be configured to:
receive, in a first execution environment, the first request from the first application;
obtain the type information of the first application in the first execution environment; and
associate the first application with the second biometric feature in a second execution environment.

14. The mobile terminal of claim 10, wherein the user prompt information is displayed in a user interface display, wherein the user prompt information prompts the user to enter a specific biometric feature for verification before associating the first application with the second biometric feature, and wherein the one or more application programs further cause the processor to be configured to:
receive the specific biometric feature from the user;
verify the user using the specific biometric feature; and
associate, in response to receiving the specific biometric feature from the user and verifying the user, the first application with the second biometric feature.

15. A mobile terminal, comprising:
a memory configured to store one or more application programs;
one or more processors coupled to the memory, wherein the one or more application programs cause the one or more processors to be configured to receive a first request to associate a first application with a first biometric feature; and
an input device coupled to the memory and the one or more processors and configured to obtain a first fingerprint image from a user, and
wherein the one or more application programs further cause the one or more processors to be configured to:
determine a first fingerprint storage template stored in the memory by performing semantic analysis, wherein the first fingerprint storage template matches the first fingerprint image, and wherein the first fingerprint storage template comprises a plurality of fingerprint images;
display, in response to the first fingerprint storage template matching the first fingerprint image, user prompt information, wherein the user prompt information prompts the user whether to set the first fingerprint storage template as an authentication feature of the first application; and
associate, in response to receiving a user confirmation entered by the user, the first application with the first fingerprint storage template such that the first application uses the first fingerprint storage template to perform authentication.

16. The mobile terminal of claim 15, wherein the input device is further configured to obtain identity authentication information from the user before the one or more processors associate the first application with the first fingerprint storage template, wherein the identity authentication information comprises information used for identity authentication, and wherein the one or more application programs further cause the one or more processors to be configured to:
perform the identity authentication according to the identity authentication information; and
associate the first application with the first fingerprint storage template after the identity authentication succeeds.

17. The mobile terminal of claim 16, wherein when obtaining the identity authentication information from the user, the input device is configured to obtain a gesture from the user.

18. The mobile terminal of claim 16, wherein when obtaining the identity authentication information from the user, the input device is further configured to obtain a password from the user.

19. The mobile terminal of claim 16, wherein when obtaining the identity authentication information from the user, the input device is further configured to obtain a biometric feature from the user.

20. The mobile terminal of claim 15, wherein the user prompt information is displayed in a user interface display, wherein the user prompt information prompts the user to enter a specific biometric feature for verification before associating the first application with the first fingerprint storage template, and wherein the one or more application programs further cause the processor to be configured to:
receive the specific biometric feature from the user;
verify the user using the specific biometric feature; and associate, in response to receiving the specific biometric feature from the user and verifying the user, the first application with the first fingerprint storage template.

* * * * *